United States Patent
Miki et al.

(10) Patent No.: US 10,666,450 B2
(45) Date of Patent: May 26, 2020

(54) OPERATION EXECUTION CONTROL SERVER, RULE GENERATION SERVER, TERMINAL DEVICE, LINKAGE SYSTEM, METHOD FOR CONTROLLING OPERATION EXECUTION CONTROL SERVER, METHOD FOR CONTROLLING RULE GENERATION SERVER, METHOD FOR CONTROLLING TERMINAL DEVICE, AND COMPUTER-READABLE RECORDING MEDIUM

(71) Applicant: SHARP KABUSHIKI KAISHA, Sakai, Osaka (JP)

(72) Inventors: Kazuhiro Miki, Sakai (JP); Masaya Nakamura, Sakai (JP); Masahiro Chiba, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 31 days.

(21) Appl. No.: 15/757,813

(22) PCT Filed: Sep. 15, 2016

(86) PCT No.: PCT/JP2016/077304
§ 371 (c)(1),
(2) Date: Mar. 6, 2018

(87) PCT Pub. No.: WO2017/094323
PCT Pub. Date: Jun. 8, 2017

(65) Prior Publication Data
US 2019/0036723 A1 Jan. 31, 2019

(30) Foreign Application Priority Data

Dec. 1, 2015 (JP) ................................. 2015-234722

(51) Int. Cl.
*H04L 12/28* (2006.01)
*G06F 13/00* (2006.01)
*G06F 9/54* (2006.01)
*B25J 11/00* (2006.01)

(52) U.S. Cl.
CPC ....... *H04L 12/2814* (2013.01); *B25J 11/0005* (2013.01); *G06F 9/54* (2013.01);
(Continued)

(58) Field of Classification Search
CPC ............. H04L 12/2814; H04L 12/2818; H04L 12/2825
See application file for complete search history.

(56) References Cited

U.S. PATENT DOCUMENTS

2002/0055794 A1   5/2002  Takae et al.
2003/0087665 A1*  5/2003  Tokkonen ......... H04M 1/72569
                                                    455/556.1

(Continued)

FOREIGN PATENT DOCUMENTS

CN       104142659 A     11/2014
JP      2002-092194 A     3/2002
(Continued)

OTHER PUBLICATIONS

Office Action dated Dec. 12, 2019 for U.S. Appl. No. 15/555,549.

*Primary Examiner* — Nasser M Goodarzi
*Assistant Examiner* — Adil Ocak
(74) *Attorney, Agent, or Firm* — ScienBiziP, P.C.

(57) ABSTRACT

Within a certain time period, an action is executed according to a circumstance in which a plurality of events occur. A linking server (1) includes (i) an event detecting section (103) which detects an occurrence of each of a plurality of events specified in a linking rule and (ii) an action execution control section (105) which controls a device controlling server (2) to execute an action in a case where an occurrence (Continued)

of one of the plurality of events is detected and then, within the certain time period, occurrences of all of remaining ones of the plurality of events are detected.

5 Claims, 11 Drawing Sheets

(52) U.S. Cl.
CPC .......... *G06F 13/00* (2013.01); *H04L 12/2818* (2013.01); *H04L 12/2825* (2013.01); *H04L 2012/2847* (2013.01)

(56) References Cited

U.S. PATENT DOCUMENTS

| | | | |
|---|---|---|---|
| 2012/0131185 A1* | 5/2012 | Petersen | H04L 41/069 709/224 |
| 2014/0067131 A1 | 3/2014 | Park et al. | |
| 2014/0180488 A1 | 6/2014 | Hirayama | |
| 2014/0317410 A1 | 10/2014 | Yamaguchi et al. | |
| 2015/0094825 A1 | 4/2015 | Kinoshita et al. | |
| 2016/0182704 A1 | 6/2016 | Minezawa et al. | |
| 2016/0277203 A1 | 9/2016 | Jin et al. | |
| 2016/0323977 A1 | 11/2016 | Sun et al. | |
| 2018/0173409 A1 | 6/2018 | Usuki et al. | |

FOREIGN PATENT DOCUMENTS

| | | |
|---|---|---|
| JP | 2004-145875 A | 5/2004 |
| JP | 2006-342978 A | 12/2006 |
| JP | 2008-033618 A | 2/2008 |
| JP | 2010-152708 A | 7/2010 |
| JP | 2014-211873 A | 11/2014 |
| JP | 2014-216884 A | 11/2014 |
| JP | 2015-070430 A | 4/2015 |
| JP | 2015-144027 A | 8/2015 |

\* cited by examiner

FIG. 4

| RULE IDENTIFICATION INFORMATION | TRIGGER | SET TIME PERIOD | ACTION | PRIORITY RANK | NUMBER OF TIMES OF USE |
|---|---|---|---|---|---|
| LINKING RULE A | (1) FRONT DOOR OPEN<br>(2) LIVING ROOM DOOR OPEN | 5 MINUTES | ROBOT SPEAKING "WELCOMING" | 10 | 10 |
| LINKING RULE B | (1) BATHROOM DOOR OPEN<br>(2) LIVING ROOM DOOR OPEN | 5 MINUTES | ROBOT SPEAKING "HAND WASHING CHECK" | 8 | 15 |
| LINKING RULE C | (1) FRONT DOOR OPEN<br>(2) ROBOT SPEAKING "WELCOMING"<br>(3) TV ON | 10 MINUTES | (1) ROBOT SPEAKING "WELCOMING"<br>(2) TV SPEAKING "RELAXING" | 10 | 5 |
| LINKING RULE C' | (1) FRONT DOOR OPEN<br>(2) NOT EXECUTING ROBOT SPEAKING "WELCOMING"<br>(3) TV ON | 10 MINUTES | TV SPEAKING "WELCOMING" | 10 | 2 |
| ⋮ | ⋮ | ⋮ | ⋮ | ⋮ | ⋮ |

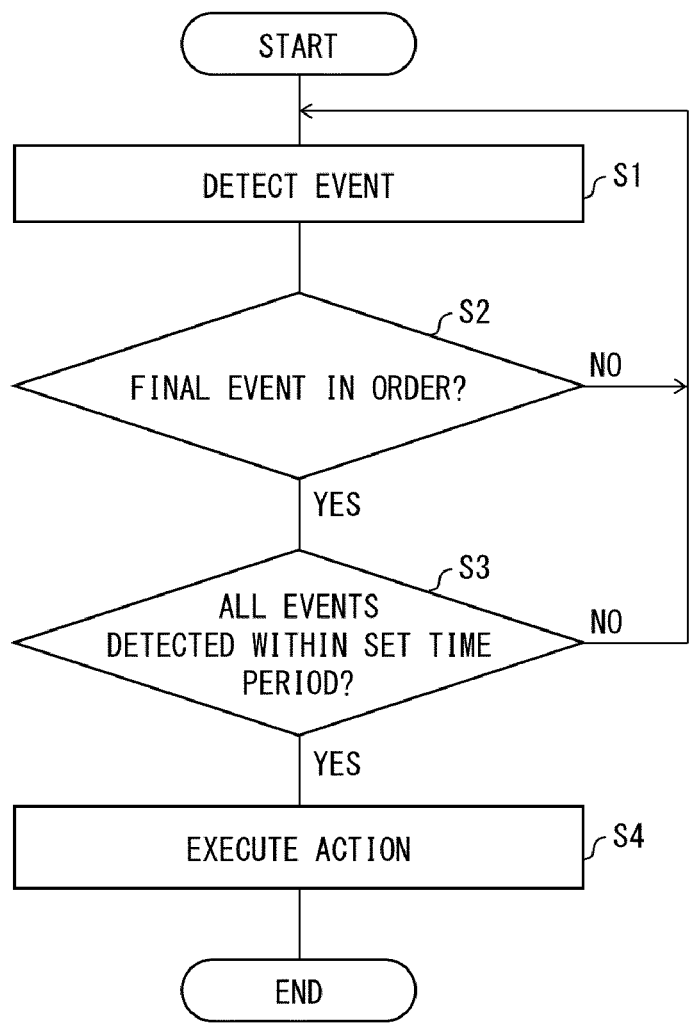

OPERATION EXECUTION CONTROL SERVER, RULE GENERATION SERVER, TERMINAL DEVICE, LINKAGE SYSTEM, METHOD FOR CONTROLLING OPERATION EXECUTION CONTROL SERVER, METHOD FOR CONTROLLING RULE GENERATION SERVER, METHOD FOR CONTROLLING TERMINAL DEVICE, AND COMPUTER-READABLE RECORDING MEDIUM

TECHNICAL FIELD

The present invention relates to, for example, an operation execution controlling server which controls an operation execution service to execute an action in accordance with a linking rule indicative of the operation and of a trigger that triggers the operation.

BACKGROUND ART

A system which links a plurality of network services is known as conventional art. For example, Patent Literature 1 below discloses an intermediation method which facilitates operations for user registration during linking of a plurality of network services.

CITATION LIST

Patent Literature

[Patent Literature 1]
Japanese Patent Application Publication, Tokukai, No. 2014-211873 (Publication Date: Nov. 13, 2014)

SUMMARY OF INVENTION

Technical Problem

Using conventional art such as that described above makes it possible for a service for controlling operations of a device to control the device to carry out a certain operation, the service being triggered to do so by provision of information from another service. For example, obtaining information indicating that a living room door in a user's house has been opened can be a trigger to control a device in the living room to speak (output a voice) a message directed to the user.

However, according to such conventional art, only a single event can be set as a trigger. This in some cases makes it impossible to execute an action according to the circumstances. For example, in a case where a user returns home and opens the living room door, an appropriate welcoming message is, for example, "Welcome home". In a case where the user is leaving the living room, an appropriate message is, for example, "See you". However, with conventional art such as that described above, it is only possible to speak a message of a certain content in response to such a single event that the living room door is opened. It is therefore impossible to speak different messages according to varying circumstances.

The present invention has been made in view of the problem, and it is an object of the present invention to achieve a linking server and the like which make it possible to execute an action according to a circumstance in which a plurality of events occur within a certain time period.

Solution to Problem

In order to attain the object, an operation execution controlling server in accordance with an embodiment of the present invention is an operation execution controlling server which controls an operation execution service to execute an action in accordance with a linking rule indicative of the action and of a trigger that triggers the action, the linking rule being set so that occurrences of a plurality of events serve as the trigger corresponding to the action, the operation execution controlling server including: an event detecting section; and an operation execution control section, the event detecting section being configured to detect each of the occurrences of the plurality of events according to information received from an information providing service, and the operation execution control section being configured to control the operation execution service to execute the action in a case where the event detecting section detects an occurrence of one of the plurality of events and then detects, within a certain time period, occurrences of all of remaining ones of the plurality of events.

In order to attain the object, a rule generating server in accordance with an embodiment of the present invention is a rule generating server that generates a linking rule in accordance with which an operation execution controlling server controls an operation execution service to execute an action, the linking rule being able to specify a plurality of events, an occurrence of each of which is detected (i) as a trigger that triggers the action and (ii) according to information providing service transmitted from an information providing service to the operation execution controlling server, the rule generating server including: a receiving section; and a rule generating section, the receiving section being configured to receive, from a terminal device for use in registration of the linking rule, (i) designation of the action, (ii) designation of the plurality of events, and (iii) designation of an upper limit of a time period between a time point at which an occurrence of one of the plurality of events is detected and a time point at which occurrences of all of remaining ones of the plurality of events, and the rule generating section being configured to generate the linking rule in which the action, the plurality of events, and the time period thus received by the receiving section are associated with each other.

In order to attain the object, a terminal device in accordance with an embodiment of the present invention is a terminal device that controls a rule generating server to generate a linking rule in accordance with which an operation execution controlling server controls an operation execution service to execute an action, the linking rule being able to specify a plurality of events, an occurrence of each of which is detected by the operation execution controlling server (i) as a trigger that triggers the action and (ii) according to information providing service transmitted from an information providing service to the operation execution controlling server, the terminal device including: a rule setting section; and an information notifying section, the rule setting section being configured to receive, from a user who registers the linking rule, (i) designation of the action, (ii) designation of the plurality of events, and (iii) designation of an upper limit of a time period between a time point at which an occurrence of one of the plurality of events is detected and a time point at which occurrences of all of remaining ones of the plurality of events, and the information notifying section being configured to notify the rule generating server of the action, the plurality of events, and the time period thus received by the rule setting section, so that the rule generating server generates the linking rule in which the action, the plurality of events, and the time period are associated with each other.

In order to attain the object, a linking system in accordance with an embodiment of the present invention is a linking system including: an information providing server; a device controlling server; an operation execution controlling server; and a control-target device, the operation execution controlling server being configured to control the control-target device to execute an action in accordance with a linking rule indicative of the action and of a trigger that triggers the action, the linking rule being set so that occurrences of a plurality of events serve as the trigger corresponding to the action, the information providing server being configured to transmit, to the operation execution controlling server, information concerning the plurality of events, and the operation execution controlling server being configured to control, via the device controlling server, the control-target device to execute the action in a case where an occurrence of one of the plurality of events is detected according to the information transmitted from the information providing server and then, within a certain time period, occurrences of all of remaining ones of the plurality of events are detected.

In order to attain the object, an operation execution controlling server controlling method in accordance with an embodiment of the present invention is a method of controlling an operation execution controlling server which controls an operation execution service to execute an action in accordance with a linking rule indicative of the action and of a trigger that triggers the action, the linking rule being set so that occurrences of a plurality of events serve as the trigger corresponding to the action, the method including the steps of: (a) detecting each of the occurrences of the plurality of events according to information received from an information providing service; and (b) controlling the operation execution service to execute the action in a case where in the step (a), an occurrence of one of the plurality of events is detected and then, within a certain time period, occurrences of all of remaining ones of the plurality of events are detected.

In order to attain the object, a rule generating server controlling method in accordance with an embodiment of the present invention is a method of controlling a rule generating server that generates a linking rule in accordance with which an operation execution controlling server controls an operation execution service to execute an action, the linking rule being able to specify a plurality of events, an occurrence of each of which is detected (i) as a trigger that triggers the action and (ii) according to information providing service transmitted from an information providing service to the operation execution controlling server, the method including the steps of: (a) receiving, from a terminal device for use in registration of the linking rule, (i) designation of the action, (ii) designation of the plurality of events, and (iii) designation of an upper limit of a time period between a time point at which an occurrence of one of the plurality of events is detected and a time point at which occurrences of all of remaining ones of the plurality of events; and (b) generating the linking rule in which the action, the plurality of events, and the time period thus received in the step (a) are associated with each other.

In order to attain the object, a terminal device controlling method in accordance with an embodiment of the present invention is a method of controlling a terminal device that controls a rule generating server to generate a linking rule in accordance with which an operation execution controlling server controls an operation execution service to execute an action, the linking rule being able to specify a plurality of events, an occurrence of each of which is detected by the operation execution controlling server (i) as a trigger that triggers the action and (ii) according to information providing service transmitted from an information providing service to the operation execution controlling server, the method including the steps of: (a) receiving, from a user who registers the linking rule, (i) designation of the action, (ii) designation of the plurality of events, and (iii) designation of an upper limit of a time period between a time point at which an occurrence of one of the plurality of events is detected and a time point at which occurrences of all of remaining ones of the plurality of events; and (b) notifying the rule generating server of the action, the plurality of events, and the time period thus received in the step (a), so that the rule generating server generates the linking rule in which the action, the plurality of events, and the time period are associated with each other.

Advantageous Effects of Invention

With an embodiment of the present invention, it is advantageously possible to execute an action according to a circumstance in which a plurality of events occur within a certain time period.

BRIEF DESCRIPTION OF DRAWINGS

FIG. 4 is a view illustrating linking rule management information which is used by the linking server.

FIG. 5 is a flow chart illustrating a process in which the linking server detects a triggering event and causes an action to be executed.

DESCRIPTION OF EMBODIMENTS

Embodiment 1

The following description will discuss an embodiment of the present invention in detail with reference to FIGS. 1 through 5.

[Overview of System]

Figure 2:
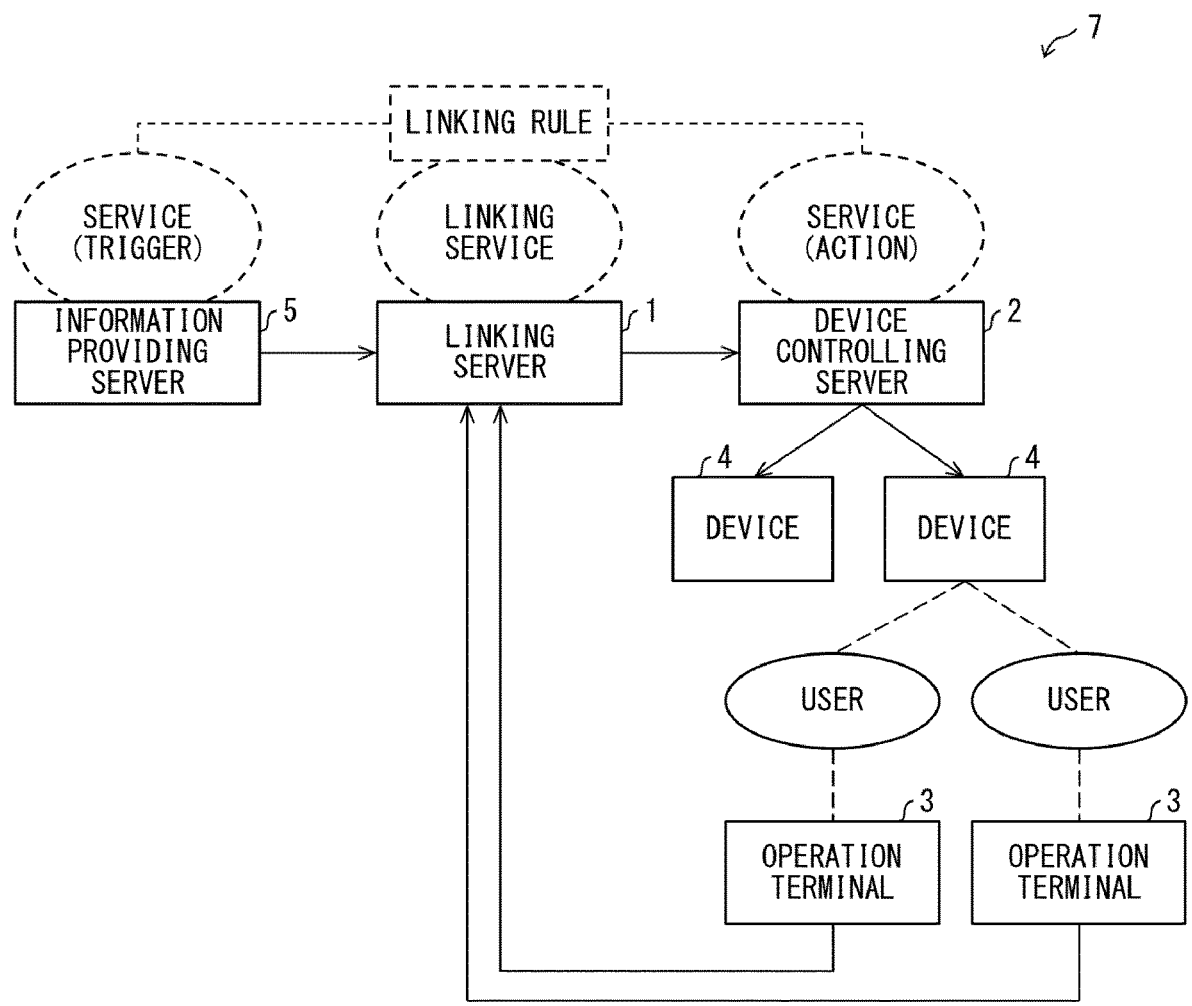
FIG. 2 is a diagram schematically illustrating a linking system including the linking server and the operation terminal.

An overview of a linking system in accordance with Embodiment 1 will be described first with reference to FIG. 2. FIG. 2 is a diagram schematically illustrating the linking system 7. The linking system 7 provides a linking service for linking a plurality of services.

Services to be linked in the linking system 7 can be classified into trigger services (information providing service) and action services (operation execution service). In other words, in the linking system 7, in a case where a certain event relating to a trigger service occurs, an action service execute a certain action. This makes it possible to provide a variety of linking services in which differing services are combined.

Embodiment 1 will discuss an example in which (i) a trigger service is a service for providing notification of information concerning a certain event and (ii) an action service is a service for controlling a device (control-target device) 4 to execute a certain operation, more specifically, for controlling the device 4 to speak. Note that the trigger service is not limited to any particular one. For example, the trigger service can be a service for providing notification that a user has opened a living room door of the user's home. Likewise, the action service is also not limited to services controlled by the devices 4.

As illustrated, the linking system 7 includes (i) a linking server (operation execution controlling server, rule generating server) 1 for providing the linking service, (ii) a device controlling server 2 for providing the action service, (iii) operation terminals (terminal devices) 3 which are used for, for example, setting a linking rule, (iv) the devices 4 which are controlled by the device controlling server 2, and (v) information providing servers 5 which provide the trigger service. Note that the linking rule is information indicative of (i) an action to be executed by an operation execution service and (ii) a trigger that triggers the action. Embodiment 1 will discuss an example in which the linking server 1 generates a linking rule and uses the linking rule (action execution control in accordance with the linking rule). However, these processes can be individually executed by different devices (servers).

In a case where an information providing server 5 receives a result of detection by a sensor provided within a living range of the user (e.g., home) and then judges, based on the result, that a certain event (e.g., door being opened) occurred, the information providing server 5 notifies the linking server 1 that the certain event has occurred. By the notification, the linking server 1 detects that the certain event has occurred. With this detection as a trigger, the linking server 1 controls the device controlling server 2 to control a device 4 to output a certain voice. This makes it possible, for example, to control a device 4, which is installed in the user's home, to speak "Welcome home" to the user when the user returns home and opens door.

Each of the devices 4 need only be a device controlled by the device controlling server 2 and is not particularly limited. Embodiment 1 will discuss (i) an example in which one device 4 is a robot equipped with an ability to converse with the user and (ii) an example in which another device 4 is a home-use electrical appliance equipped with an ability to converse with the user (hereinafter referred to as "home appliance"). As in the illustrated example, each device 4 can be shared by a plurality of users.

Each user has an operation terminal 3 which can be used to set a linking rule so that controlling an operation of a device 4 is an action. According to the linking system 7, each linking rule is set so as to be able to specify (i) a plurality of events, (ii) an upper limit of a time period (certain time period) in which an occurrence of one of the plurality of events is detected and then occurrences of all of remaining ones of the plurality of events are detected, and (iii) an order of the occurrences of the plurality of events (this configuration will be described later in detail). The linking rule is set so as to be able to specify an action to be executed in a case where the plurality of events are detected within the upper limit of the time period. Specifically, according to the linking system 7, a control in accordance with the linking rule makes it possible to control a device 4 to execute an action corresponding to a trigger which is occurrences of the plurality of events in a certain order within the upper limit of the time period.

[Examples of Linking Rule]

Figure 3:
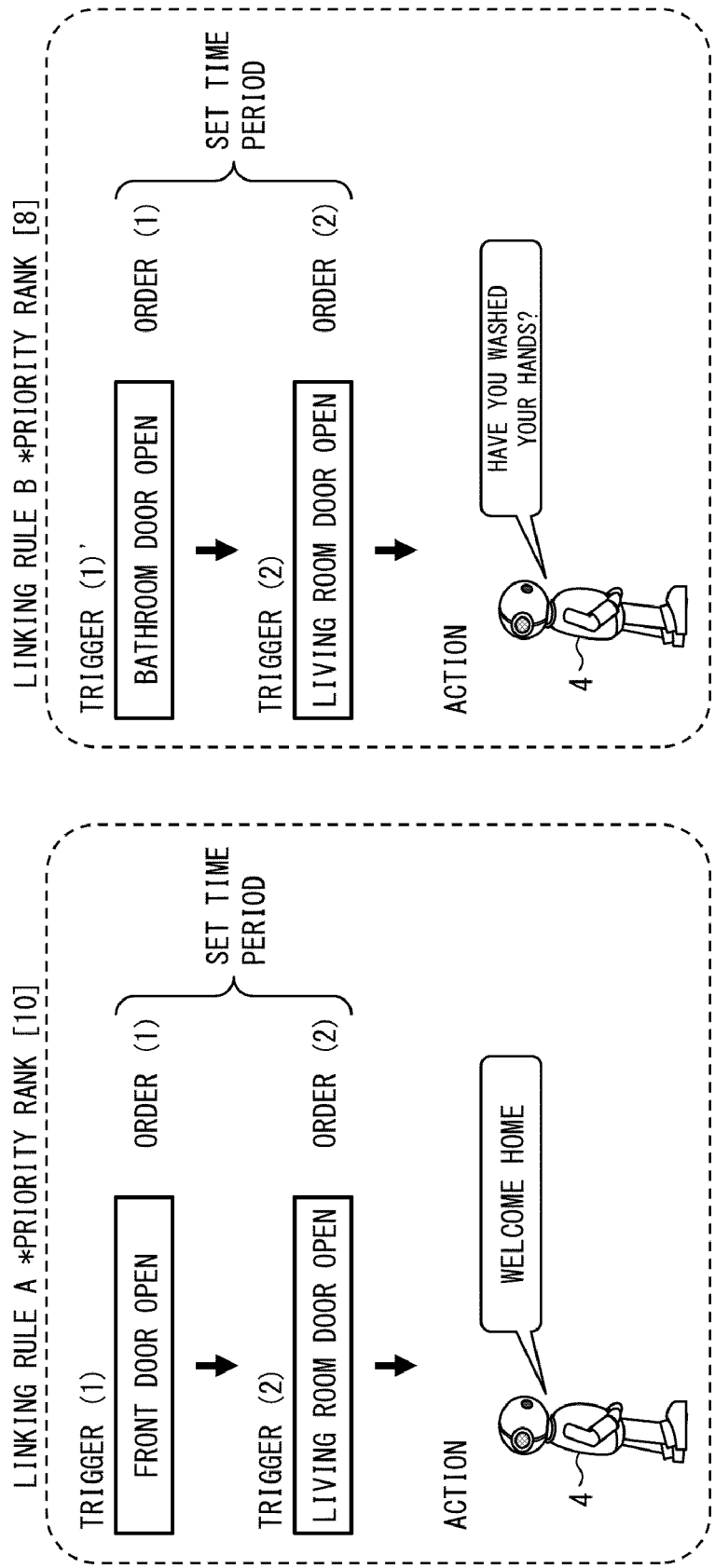
FIG. 3 is a diagram showing examples of the linking rules used in the linking system.

Examples of the linking rule to be used in the linking system 7 will be described next with reference to FIG. 3. FIG. 3 is a diagram showing the examples of the linking rules used in the linking system 7. Linking rules A and B illustrated in FIG. 3 each include two triggers (events) and one action. An order of occurrences of the two triggering events of each linking rule is specified, and an upper limit of a time period between an occurrence of a first triggering event and an occurrence of a second triggering event is specified. Each of the linking rules is thus scenario-like information which indicates (i) a plurality of events, (ii) at least one action, and (iii) the order of the plurality of events. In each of the linking rules, a priority rank is further specified.

Specifically, the linking rule A illustrated in FIG. 3 is set so that (i) the first triggering event is an event in which a front door of a user's house is opened (Front door OPEN) and (ii) the second triggering event is an event in which a living room door of the user's house is opened (Living room door OPEN). The linking rule A is set to specify an action to control the device 4, which is a robot, to speak "Welcome home". This makes it possible to control the device 4 to speak "Welcome home" in a case where the user takes such a series of actions as opening the front door when retuning home and then, within the upper limit of the time period (e.g., 5 minutes), entering the living room, that is, opening the front door to enter the living room.

The linking rule B illustrated in FIG. 3 is set so that (i) the first triggering event is an event in which a bathroom door of the user's house is opened (Bathroom door OPEN) and (ii) the second triggering event is, as in the linking rule A, the Living room door OPEN. The linking rule B is set to specify an action to control the device 4, which is a robot, to speak "Have you washed your hands?". This makes it possible to control the device 4 to speak "Have you washed your hands?" in a case where the user uses a bathroom and then, within the upper limit of the time period (e.g., 10 minutes), enters the living room.

With the linking system 7, it is thus possible to use a linking rule which is set so that a plurality of events serve as a trigger. This allows an action, which is appropriate according to a behavioral history of the user, to be executed. For example, while the linking rules A and B are identical in terms of the second triggering event, it is possible to control the device 4 to execute different actions according to the different first triggering events. Specifically, it is possible to (i) control the device 4 to speak a message to welcome the user in a case where the user returns home and then enters the living room and (ii) controls the device 4 to speak a message to check on washing of the hands in a case where the user leaves the bathroom and then enters the living room.

[Apparatus Configurations of Linking Server and of Operation Terminals]

Figure 1:
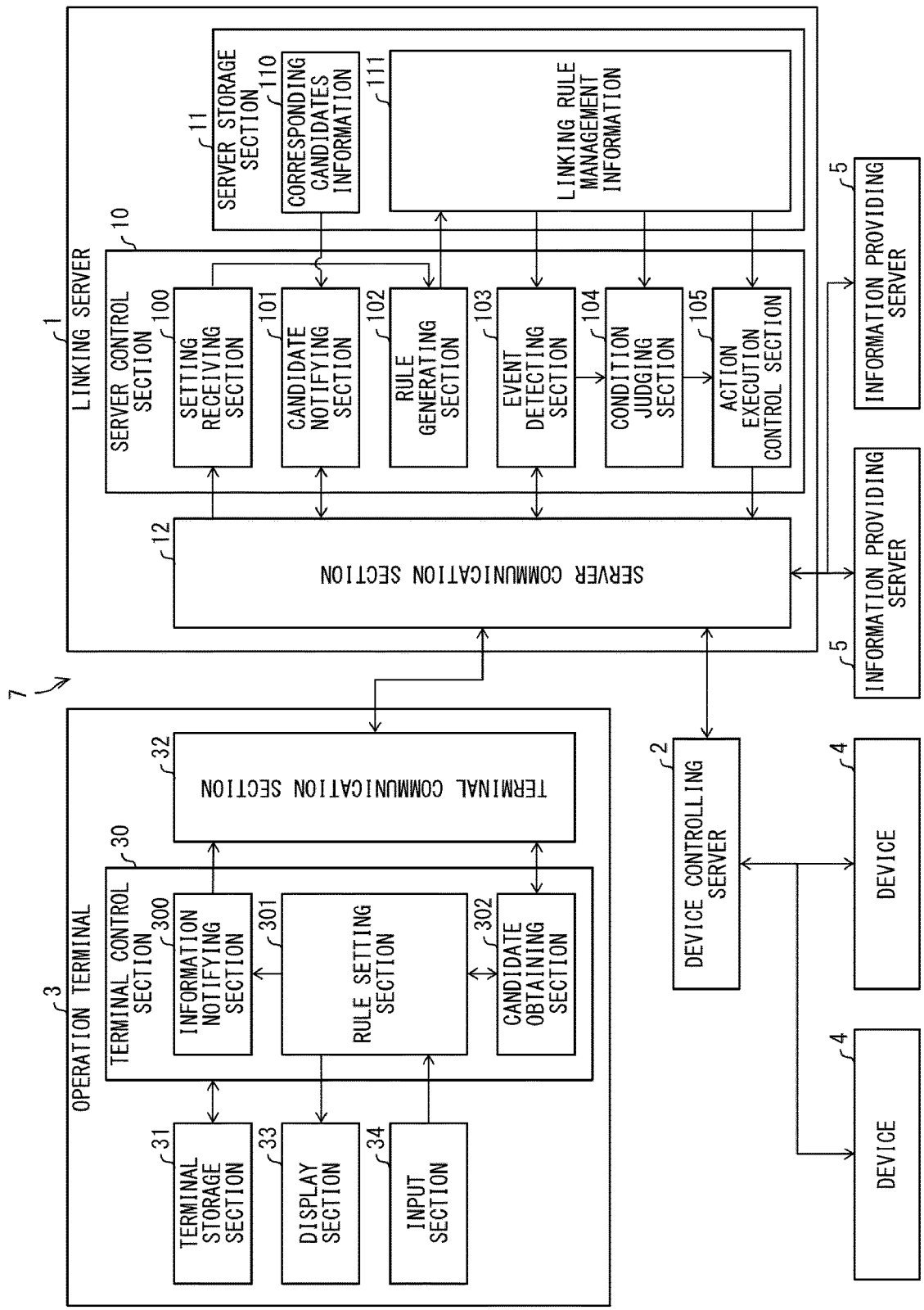
FIG. 1 is a block diagram illustrating main configurations of a linking server and of an operation terminals in accordance with Embodiment 1 of the present invention.

Apparatus configurations of the linking server 1 and of the operation terminals 3 will be described next with reference to FIG. 1. FIG. 1 is a block diagram illustrating main configurations of the linking server 1 and of the operation terminals 3. The linking server 1 will be described first, and then the operation terminals 3 will be described later.

[Configuration of Linking Server]

As illustrated, the linking server 1 includes (i) a server control section 10 which comprehensively controls each section of the linking server 1, (ii) a server storage section 11 which stores various data used by the linking server 1, and (iii) a server communication section 12 which allows the linking server 1 to communicate with other devices. Note that FIG. 1 shows an example in which a single communication section 12 is used for communication with the device controlling server 2, the operation terminals 3, and the information providing servers 5. Alternatively, communication can be carried out via differing communication sections (communication interfaces) according to the device to be communicated with.

The server control section 10 includes a setting receiving section (receiving section) 100, a candidate notifying section 101, a rule generating section 102, an event detecting section 103, a condition judging section 104, and an action execution control section (operation execution control section) 105. The server storage section 11 stores corresponding candidates information 110 and linking rule management information 111.

The setting receiving section 100 receives various designations concerning generation of linking rules. Specifically, the setting receiving section 100 receives (i) designation of an action, (ii) designation of a trigger (a plurality of events can be designated as a trigger), and (iii) designation of an upper limit of a time period. The upper limit of the time period serves as a time limit during which a plurality of events are to be detected.

The candidate notifying section 101 notifies, in a case where the setting receiving section 100 receives designation of one of the plurality of events, the operation terminals 3 of at least one of (i) an event which can serve as a trigger together with the one of the plurality of events and (ii) an action which can be triggered by the trigger.

The rule generating section 102 generates a linking rule in which the action, the trigger, and the time period upper limit thus received by the setting receiving section 100 are associated with each other. The rule generating section 102 also registers the generated linking rule in the linking rule management information 111.

The event detecting section 103 detects an occurrence of each of the plurality of events which are set as a trigger in the linking rule. Embodiment 1 will discuss an example in which an occurrence of an event is detected through notification from the information providing servers 5 (information providing services). Specifically, in a case where a linking rule is registered, the event detecting section 103 instructs an information providing server 5 to provide notification that an event set as a trigger in the linking rule has occurred. In this way, in a case where the event occurs, the information providing server 5 notifies the linking server 1 of information indicative of the occurrence of the event. By receiving the information, the event detecting section 103 detects the occurrence of the event. Alternatively, the event detecting section 103 can detect an occurrence of an event through notification from other devices (other services) such as the device controlling server 2. Alternatively, information outputted from, for example, the device 4 or a sensor (e.g., information indicative of detection of an event in which the device 4 is turned on or an event in which a door is opened/closed) can be transmitted from the device 4 or the sensor to the linking server 1 without being routed through the device controlling server 2 or the like. In such a case, it is possible that when the device 4 or the sensor is connected to the linking server 1, the connection thus established serves as a trigger to start transmitting information such as that described above.

The condition judging section 104 judges, for each of the linking rules registered in the linking rule management information 111, whether or not conditions for executing an action are met, that is, whether or not a plurality of events have occurred within an upper limit of a time period.

When the event detecting section 103 detects an occurrence of one of the plurality of events set as a trigger and then detects, within the upper limit of the time period, occurrences of all of remaining ones of the plurality of events, the action execution control section 105 causes the action to be executed. Specifically, in a case where the condition judging section 104 judges that the conditions for executing the action according to the linking rule are met, the action execution control section 105 controls the device controlling server 2 to execute the action. Note that since the device controlling server 2 controls the devices 4 to execute an action, it can be said that the action execution control section 105 controls the devices 4 to execute an action via the device controlling server 2.

The corresponding candidates information 110 is information for deciding candidates of triggers and actions to present to a user in a case where a linking rule is to be set. More specifically, the corresponding candidates information 110 is information indicative of a combination of a trigger (event(s)) and an action which can be included in a single linking rule. By referring to the corresponding candidates information 110, the candidate notifying section 101 can specify at least one of an event(s) and an action which can be included, in the linking rule, together with a trigger and an action which are already designated by the user.

The linking rule management information 111 is information for use in management of set linking rules. Any linking rule set by the user is registered in the linking rule management information 111. The linking rule management information 111 can be configured as illustrated in, for example, FIG. 4. FIG. 4 is a view illustrating the linking rule management information 111. The linking rule management information 111 illustrated in FIG. 4 is in a table format in which rule identification information, triggers, set time periods, actions, priority ranks, and the numbers of times of use are associated.

The rule identification information is information for use in identification of linking rules. A unique code as the rule identification information is assigned to each linking rule. Stored in each line of the "trigger" column is information indicative of an event(s) that serve(s) as a trigger for triggering an action specified in a corresponding linking rule. The events are assigned with corresponding numbers which indicate the order of occurrences of the events. Stored in each line of the "set time period" column is an upper limit of a time period between an occurrence of a first event and an occurrence of a final event which are specified in a corresponding trigger.

Stored in each line of the "action" column is information indicative of an operation to be executed by the device controlling server 2 in a case where all of events set in the corresponding line of the "trigger" column occur within an upper limit of a corresponding time period. In the example shown, the actions to be executed by the robot (one of the devices 4) include (i) robot speaking "welcoming" (the robot is controlled to speak "Welcome home") and (ii) robot speaking "hand washing check" (the robot is controlled to speak "Have you washed your hands?"). The actions to be executed by a TV (another one of the devices 4) include (i) a TV speaking "welcoming" (the TV is controlled to speak "Welcome home") and (ii) a TV speaking "relaxing" (the TV is controlled to speak "Make yourself comfortable").

Stored in each line of the "priority rank" column is information indicative of a priority rank of a corresponding linking rule in relation to the other linking rules. In the present example, numerical values of 1 through 10 (larger values have higher priority ranks). However, a method of indicating priority ranks is not limited to this example. Stored in each line of the "number of times of use" column is information indicative of the number of times a corresponding linking rule has been used (a corresponding action has been executed by meeting the trigger conditions).

[Configurations of Operation Terminals]

The operation terminals 3 are each a device which receives an operation of a user to register a linking rule, and then controls the linking server 1 to generate a linking rule according to an operation content. The operation terminals 3 can each be an information processing device such as a smartphone. An operation terminal 3 illustrated in FIG. 1 includes (i) a terminal control section 30 which comprehensively controls each section of the operation terminal 3, (ii) a terminal storage section 31 in which various data used by the operation terminal 3 is stored, and (iii) a terminal communication section 32 which allows the operation terminal 3 to communicate with other devices. The operation terminal 3 further includes (i) a display section 33 which displays an image according to a control of the terminal control section 30 and (ii) an input section 34 which receives an input operation of a user. Note that the input section 34 can be a touch panel which receives an input operation of a user on a display surface of the display section 33.

The terminal control section 30 includes an information notifying section 300, a rule setting section 301, and a candidate obtaining section 302. These processing sections can be achieved by, for example, installing application software on the operation terminal 3.

The rule setting section 301 controls certain user interface (hereinafter abbreviated as "UI") screens to be displayed, so as to receive various designations concerning generation of linking rules. Specifically, the rule setting section 301 receives (i) designation of an action, (ii) designation of a trigger (a plurality of events can be designated as a trigger), and (iii) designation of an upper limit of a time period.

The information notifying section 300 notifies the linking server 1 of the action, the trigger, and the time upper limit thus received by the rule setting section 301, so that the linking server 1 generates a linking rule in which the action, the trigger, and the time period upper limit are associated with each other.

The candidate obtaining section 302 obtains, from the candidate notifying section 101 of the linking server 1, candidates of triggers and actions to present to a user in a case where a linking rule is to be set. Then, the candidate obtaining section 302 controls the display section 33 to display the candidates thus obtained. This allows the user to select a trigger and an action from the candidates.

[Flow of Process (Trigger Detection Through Action Execution)]

A flow of a process to be executed by the linking server 1 will be described with reference to FIG. 5. FIG. 5 is a flow chart illustrating a process in which the linking server 1 detects a triggering event and causes an action to be executed (method of controlling the operation execution controlling server).

The event detecting section 103 detects, based on information of which an information providing server 5 notifies the event detecting section 103, an occurrence of an event which is set as a trigger (S1, event detecting step). Then, the condition judging section 104 judges whether or not the event detected in the step S1 is set as a final event in terms of the order of occurrence in a linking rule (S2). In a case where it is judged that the event is not set as a final event in the order of occurrence (NO in S2), the linking server 1 goes into a state in which the linking server 1 waits for detection of a next event. Then, in a case where the next event is detected, the linking server 1 carries out again the process including the step S1 and the subsequent steps.

Meanwhile, in a case where it is judged in the step S2 that the event is set as the final event in the order of occurrence (YES in S2), the condition judging section 104 judges whether or not occurrences of all of events associated with an action have been detected within a set time period (the upper limit of the time period) (S3). In other words, the condition judging section 104 judges whether or not all of flags for executing the action are raised (all of the events corresponding to the action have been detected). For example, in a case where the second event (Living room door OPEN) in the above-described linking rule A (see FIG. 4) is detected in the step S1, the condition judging section 104 judges whether or not the first event (Front door OPEN) was detected during a 5-minute period before a time point of the detection in the step S1.

In a case where the condition judging section 104 judges that all of the events have been detected (YES in S3), the action execution control section 105 instructs the device controlling server 2 to control a device 4 to execute the action corresponding to the events (S4, operation execution controlling step). This ends the process illustrated in FIG. 5. Meanwhile, in a case where the condition judging section 104 judges in the step S3 that an occurrence of at least one of the events was not detected within the set time period (NO in S3), the process illustrated in FIG. 5 ends without executing the action.

Note that the order in the action execution control in accordance with a linking rule according to Embodiment 1 is not limited to the example described above. For example, the fact that a plurality of events specified in a linking rule have occurred in a certain order can be detected by repeating a process of (i) detecting a first event in the order of occurrence in the linking rule and (ii) starting detection of a next event in the order if the first event was detected. In so doing, an action is executed in a case where an occurrence of a final event is detected within an upper limit of a time period from the occurrence of the first event.

The description above discussed an example in which an order is set for a plurality of events specified as a trigger. However, it is unnecessary to set the order. For example, it is unnecessary to set an order in a case where there is no event that serves as a trigger to directly trigger an action. For example, an order does not need to be set for a such linking rule that a cleaning robot is controlled to speak a recommended TV program in a case where the following events are detected: (i) an event in which a TV is turned on and (ii) an event in which an air conditioner starts operating. In the example shown in FIG. 5, the process of the step S2 is omitted in a case where the order of the plurality of events specified as a trigger is not set.

Embodiment 2

Figure 6:
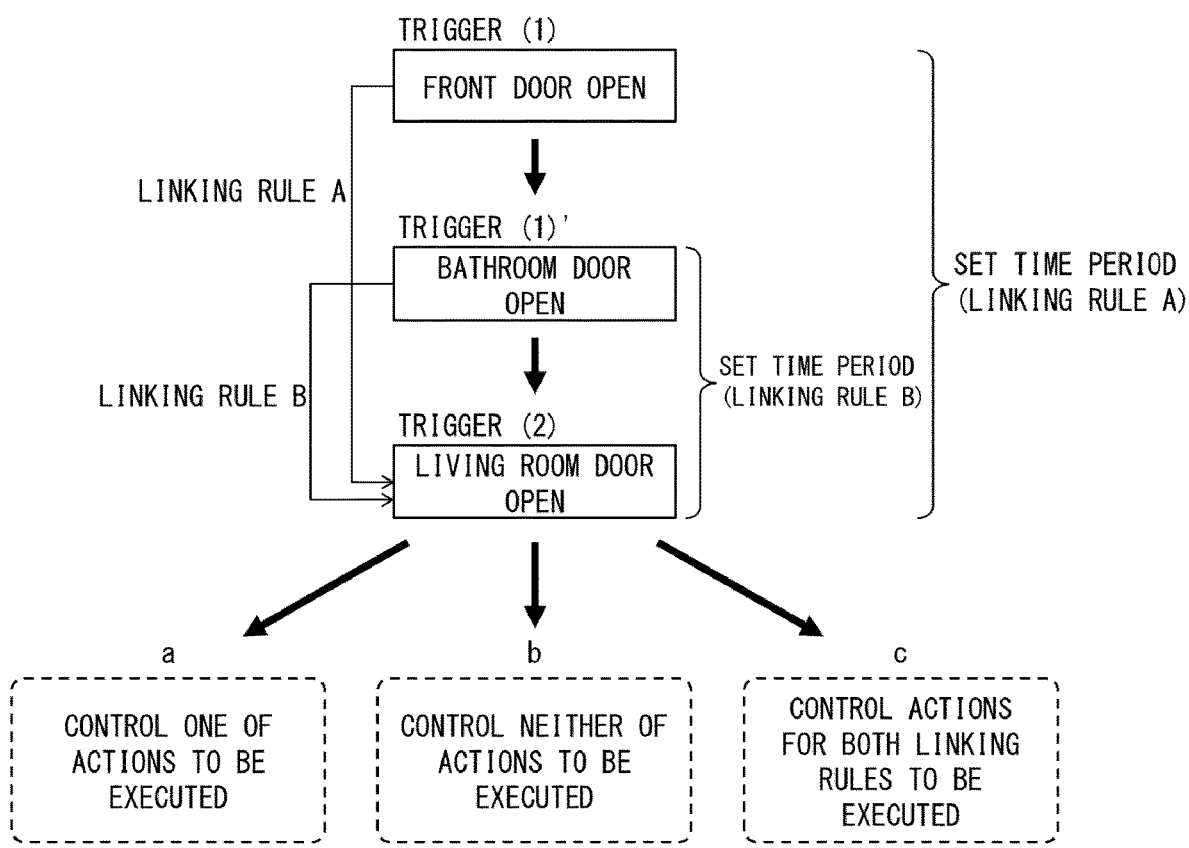
FIG. 6 is a diagram showing an example of how the linking server in accordance with Embodiment 2 of the present invention carries out a control in a case where a plurality of actions specified in respective linking rules are to be executed.

The following description will discuss another embodiment of the present invention with reference to FIG. 6. For convenience, any member identical in function to a member described in the foregoing embodiment will be given the same reference sign, and their description will be omitted. This likewise applies to Embodiment 3 and any subsequent embodiments. Embodiment 2 includes a linking server 1 that is controlled in a characteristic manner in a case where detection of a single trigger will cause a plurality of actions specified in respective linking rules to be executed. The description below deals with this arrangement with reference to FIG. 6. FIG. 6 is a diagram showing an example of how the linking server 1 is controlled in a case where a plurality of actions specified in respective linking rules are to be executed.

FIG. 6 illustrates the two linking rules described for the above embodiment (namely, the linking rules A and B). These linking rules include the same event (Living room door OPEN) set at the end of the order. This means that detection of this event will cause actions specified in the respective linking rules to be executed. The example shown in FIG. 6 is arranged such that the two linking rules to be adjusted each include a plurality of events as triggers. Linking rules to be adjusted can include a linking rule that includes only one event set as a trigger. For instance, in a case where a linking rule D is registered with which the Living room door OPEN event as an only trigger causes the TV in the living room to be on standby, adjustment can be made for the linking rule D and the linking rule A or B illustrated in FIG. 6. Adjustment can, needless to say, be made for the linking rules A, B, and C as well.

There may be a case where, for instance, the event detecting section 103 detects the Entrance door OPEN event, the Bathroom door OPEN event, and the Living room door OPEN event in sequence as in the example shown in FIG. 6. In such a case, if (i) the Entrance door OPEN event is followed by the Living room door OPEN event within the set time period of the linking rule A and (ii) the Bathroom door OPEN event is followed by the Living room door OPEN event within the set time period of the linking rule B, the respective actions for the linking rules A and B are both to be executed.

In a case where a plurality of actions are to be executed as illustrated in FIG. 6, the action execution control section 105 included in the linking server 1 of Embodiment 2 takes one of the following options A through C:

A. Control one of the actions to be executed
B. Control neither of the actions to be executed
C. Control the actions for both the linking rules to be executed.

In a case where the action execution control section 105 takes the above option A, the action execution control section 105 selects one of the actions by a method and controls the selected action to be executed. The action execution control section 105 can, for instance, refer to the respective priority ranks set for the linking rules to identify the linking rule having the higher priority ranks and control the action set for the identified linking rule to be executed. Alternatively, the action execution control section 105 can, for instance, identify the linking rule having the larger number of times of use (see FIG. 4) and control the action set for the identified linking rule to be executed. Further, the action execution control section 105 can, for instance, select an action randomly and control the selected action to be executed.

In a case where the action execution control section 105 takes the above option C, the action execution control section 105 first adjusts, before actually controlling the actions to be executed, timings of the execution of the actions to prevent a problem that occurs if the actions are executed simultaneously. The action execution control section 105 can, for instance, transmit execution instructions for the respective actions at time points different from each other. The action execution control section 105 can, in this case, first transmit an execution instruction for the action for the linking rule having the higher priority rank or larger number of uses. Alternatively, the action execution control section 105 can, for instance, combine the actions to be executed. In a case where, for instance, the actions are both speaking to the user, the action execution control section 105 can combine those spoken contents with an intervening conjunctive such as "and" to provide a series of spoken contents.

The action execution control section 105 can be configured to (i) adjust timings of execution of actions as described above only in a case where controlling the actions to be executed simultaneously will cause a problem and (ii) otherwise not adjust the timings of the execution of the actions. In a case where, for instance, (i) the actions are to be executed by the same device 4 or (ii) the actions are both speaking, controlling those actions to be executed simultaneously will cause a problem (for example, the device 4 will suffer from a sudden, heavy load of processes needed to be carried out, or the spoken contents will be difficult to hear). The action execution control section 105 can thus be configured to (i) adjust timings of execution of actions if a condition such as the above is satisfied (for example, if the actions are to be executed by the same device 4 or if the actions are both speaking by a device 4) and (ii) if no such condition is satisfied, normally control the actions to be executed. The description of the Embodiment 2 has dealt with an example in which the action execution control section 105 adjusts the timings of execution of two actions to be executed simultaneously. Similarly, the action execution control section 105 can also adjust the timings of execution of three or more actions to be executed simultaneously.

Embodiment 3

Figure 7:
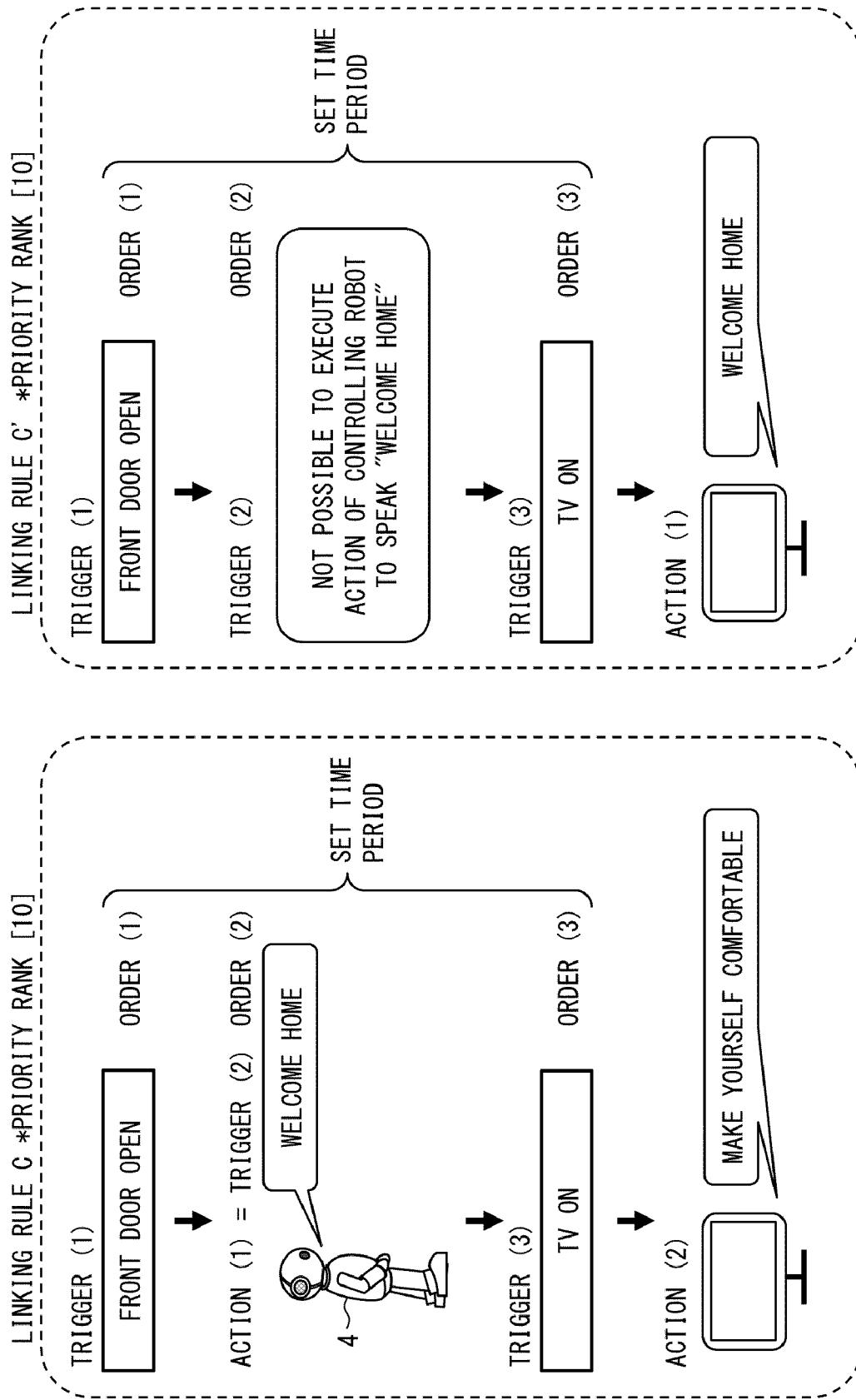
FIG. 7 is a diagram showing examples of the linking rules used in a linking system in accordance with Embodiment 3 of the present invention.

The following description will discuss still another embodiment of the present invention with reference to FIG. 7. The description of the Embodiment 3 deals with an example of setting, as a trigger for a linking rule, an event (action event) of a certain action having been executed in accordance with the linking rule (or not having been executed in spite of the linking rule). The description of Embodiment 3 also deals with an example of, in a case where a certain action was not executed, causing an action (alternative action) to be executed that compensates for the failure to cause the certain action to be executed.

FIG. 7 is a diagram showing an example of a linking rule used in the linking system 7 of Embodiment 3. FIG. 7 illustrates a linking rule C including a first triggering event, a first action (which is also a second triggering event), a third triggering event, and a second action. The linking rule C indicates that if after detection of an event set as a first trigger, (i) the first action is executed and (ii) an event set as the third trigger is detected both within the set time period for the linking rule C, the second action is executed. In this example, the event detecting section 103 detects, as occurrence of the action event, the action execution control section 105 controlling the first action to be executed. A linking rule can be set to cause an action as an action event to be executed by (i) an operation execution service that will execute the final action for the linking rule or (ii) an operation execution service other than the above operation execution service.

The linking rule C indicates that in a case where after detection of the Entrance door OPEN event, the linking server 1 has (i) successfully controlled the robot to speak "Welcome home" and has then (ii) detected an event of the TV being turned on both within the set time period, the linking server 1 of the Embodiment 3 controls the TV to speak relaxing words. The robot and the TV are each a device 4. The linking server 1 is capable of controlling the robot and the TV via the device controlling server 2 to speak. The device controlling server 2 detects the TV having been turned on and notifies the linking server 1 of the detection. The event detecting section 103 of the linking server 1 is capable of, on the basis of such a notification, detecting an event of the TV being turned on. The device controlling server 2 of this example thus provides an information providing service as well.

The linking server 1 of Embodiment 3 controls an alternative action to be executed in a case where the linking server 1 did not detect occurrence of, among the events set for the linking rule C, the action event (action) of controlling the robot to speak and detected occurrence of all other events. The above alternative action is executed in accordance with the linking rule C' illustrated in FIG. 7.

FIG. 7 illustrates a linking rule C' including a first triggering event, a second triggering event, a third triggering event, and an action. Among these events and action, the first triggering event and the third triggering event are identical respectively to the first triggering event and the third triggering event for the linking rule C. The second trigger for the linking rule C' is an event of the first action for the linking rule C not having been executed. The action for the linking rule C' is of a spoken content identical to that of the second action for the linking rule C. This means that the action for the linking rule C' is an alternative action that compensates for the failure to cause the first action for the linking rule C to be executed.

The linking server 1 of Embodiment 3 is capable of, in accordance with the linking rule C', controlling the TV to speak "Welcome home" in a case where the linking server 1 detected the Entrance door OPEN event, failed to control the robot to speak, and then detected the event of the TV being turned on. The linking server 1 may fail to control the robot to speak in a case where, for instance, the communication between the robot and the device controlling server 2 is poor, or the robot is broken down or has a flat battery. Detection of occurrence of an event of the failure to cause the action to be executed (that is, control the robot to speak) can be based on, for instance, a failure to, within a certain time period after transmitting an instruction to control the robot to speak, receive from the robot a notification of completion of the speaking.

Linking rules such as the above can be managed as part of the linking rule management information 111 similarly to the linking rules described for the above embodiments (see FIG. 4). Linking rules such as the above can be set by the user through a procedure as described later for Embodiment 4. Alternatively, the linking server 1 can automatically set an action as an alternative action in a case where the linking server 1 has generated a linking rule including a plurality of actions. In this case, the rule generating section 102 of the linking server 1 can modify the generated linking rule so that the linking rule includes an alternative action. Specifically, the rule generating section 102 replaces an action (which is not the final action but is an action that doubles as a triggering event) for the generated linking rule with a triggering event of the action not having been executed, and changes one of the actions for the generated linking rule to an alternative action. An alternative action is an action that compensates for the failure to cause an action to be executed, and can be identical to the failed action entirely or partially or different from the failed action. For the example involving the linking rule C' in FIG. 7, for instance, the linking server 1 can control the TV to, instead of speaking "Welcome home", speak to inform the user that the robot was unable to speak (for example, speak "The robot was unable to speak"). The linking server 1 can cause an alternative action to be executed by the device controlling server 2 or another device controlling service.

A linking rule including an alternative action does not need to include, as a trigger, the failure to cause an action to be executed. In this case, the linking server 1 judges in a case where when the linking server 1 has detected occurrence of the second trigger (TV ON), the linking server 1 has a record of detecting the first trigger (Entrance door OPEN) but has no record of successfully controlling the robot to speak "Welcome home" that the condition for causing an alternative action to be executed has been satisfied.

Embodiment 4

Figure 8:
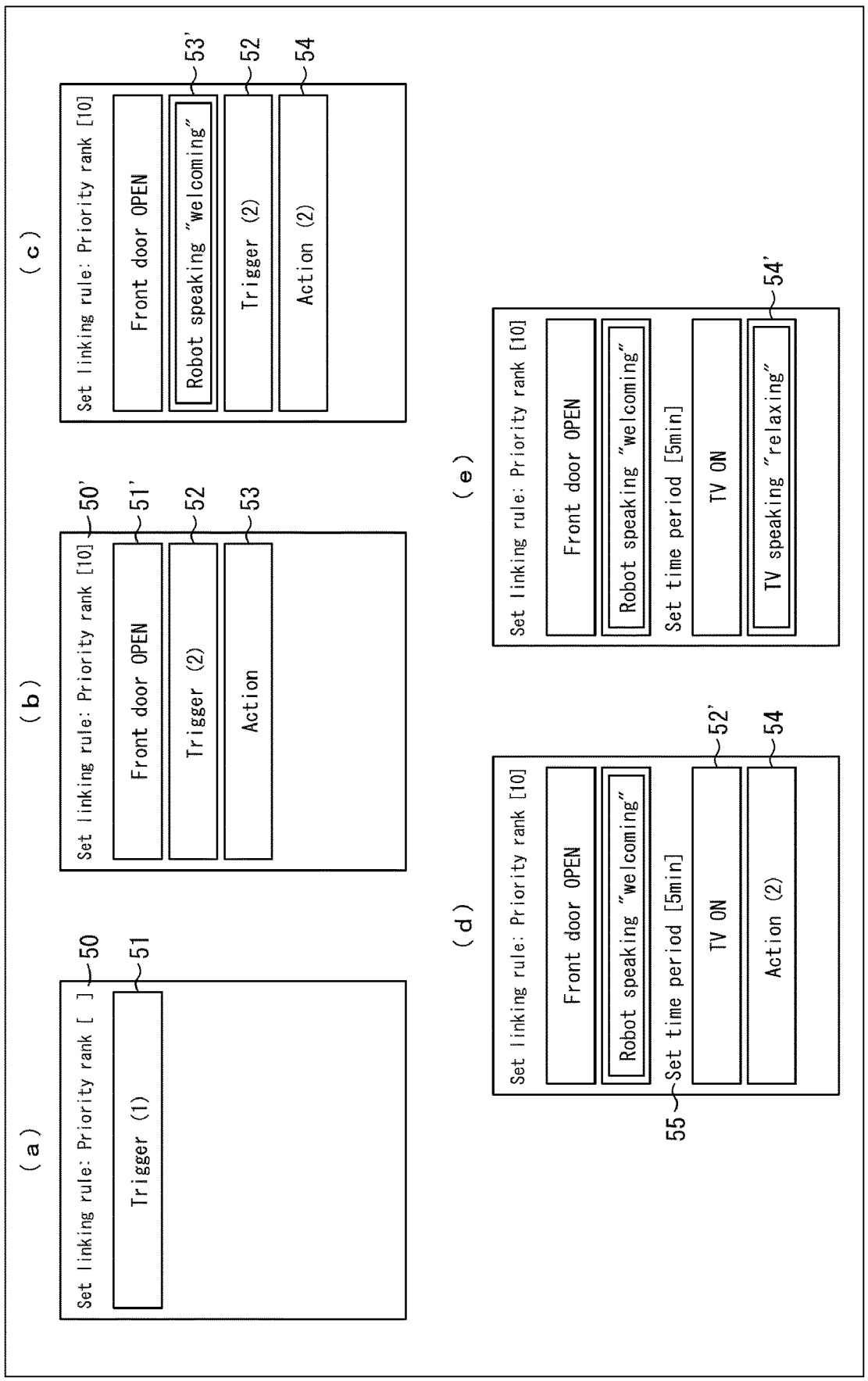
FIG. 8 is a view showing examples of UI screens displayed in generating a linking rule in Embodiment 4 of the present invention.

The following description will discuss still another embodiment of the present invention with reference to FIGS. 8 through 11. The description of Embodiment 4 will deal with how a linking rule is generated. With reference to FIG. 8, the description below first deals with UI screens displayed by an operation terminal 3 when a linking rule is generated. FIG. 8 is a view showing examples of UI screens displayed in generating a linking rule. FIG. 8 shows an example of how the screen transitions when the linking rule C described for the preceding embodiment is set.

When the user starts to set a linking rule, the operation terminal 3 first displays the UI screen illustrated in (a) of FIG. 8 to accept a designation for a first triggering event and a designation for a priority rank. This UI screen includes (i) a priority setting item 50 for accepting a designation for a priority rank and (ii) a first trigger setting item 51 for accepting a designation for a first triggering event. The user can select the priority setting item 50 on this UI screen to designate a desired priority rank within a range of 1 to 10. The user can also (i) select the first trigger setting item 51 on this UI screen to cause candidates of events selectable as a first triggering event to be displayed and (ii) select a desired event from among those events to set the selected event as the first triggering event. FIG. 8 shows an example of setting the priority rank at 10 (maximum value) and an "Entrance door OPEN" event as the first triggering event.

When the user has designated an event as the first triggering event, the operation terminal 3 displays the designated triggering event for the first trigger setting item 51 as illustrated in (b) of FIG. 8 (see "51'" in FIG. 8). When the user has designated the priority rank, the operation terminal 3 displays the designated priority rank for the priority setting item 50 as illustrated in (b) of FIG. 8 (see "50'" in FIG. 8). The operation terminal 3, in response to the designation for the first triggering event, also displays (i) a second trigger setting item 52 for accepting a designation for a second triggering event and (ii) a first action setting item 53 for accepting a designation for a first action as illustrated in (b) of FIG. 8. The user can (i) select the second trigger setting item 52 on this UI screen to cause candidates of events selectable as a second triggering event to be displayed and (ii) select a desired event from among those events to set the selected event as the second triggering event. The user can similarly select the first action setting item 53 on this UI screen to cause selectable candidate actions to be displayed and select a desired action to set the selected action as the first action.

Figure 9:
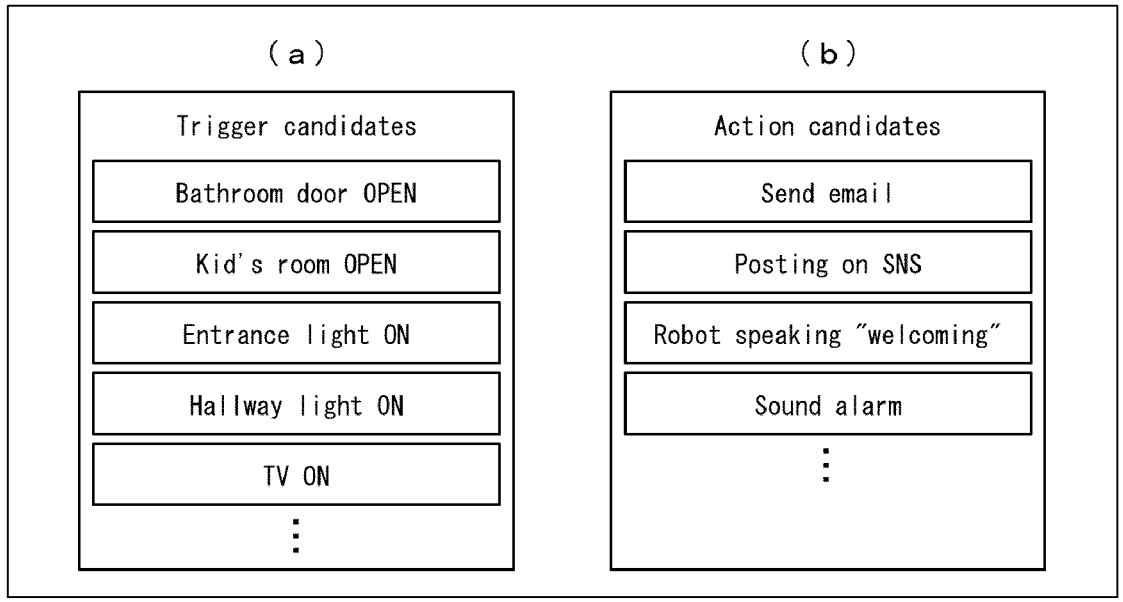
FIG. 9 is a view showing examples of UI screens that prompt the user to select candidates of a trigger and an action.

When the operation terminal 3 displays candidate events selectable as the second triggering event and candidate actions selectable as the first action, the operation terminal 3 displays only those candidate events and actions which can be combined with the designated triggering event. The description below deals with this arrangement with reference to FIG. 9. FIG. 9 is a view showing examples of UI screens that prompt the user to select candidates of a trigger and an action.

The UI screen illustrated in (a) of FIG. 9 includes a list of candidate triggering events that can be combined with a designated triggering event. Specifically, this example assumes that the user has designated an "Entrance door OPEN" event as the first triggering event (see (b) of FIG. 8). The example shown in (a) of FIG. 9 shows candidate events selectable as a second triggering event in combination with the designated triggering event (that is, events that the user can designate as a trigger together with the first triggering event). Specifically, this example shows, as candidate events, not only "Bathroom door OPEN" and "TV ON" described for the above embodiments, but also (i) "Child's room door OPEN", indicating that the door of a child's room has been opened, (ii) "Entrance light ON", indicating that the entrance light has been turned on, and (iii) "Hallway light ON", indicating that the passage light has been turned on. Similarly, the example shown in (b) of FIG. 9 shows candidate actions that can be executed in response to detection of occurrence of the triggering event (Entrance door OPEN). Specifically, this example shows, as candidate actions, not only "Robot speaking 'welcoming'" described for an embodiment above, but also (i) "Send email", indicative of sending an email to a certain email address, (ii) "Posting on SNS", indicative of posting a message on a certain social networking service (SNS), and (iii) "Sound alarm", indicative of controlling a certain device 4 to sound an alarm.

The user can select a desired event from among the displayed candidate events to designate the selected event as the second triggering event. The user can similarly select a desired action from among the displayed candidate actions to designate the selected action as the first action (that is, the action to be executed in response to the first triggering event).

In a case where when the user has selected a triggering event, a linking rule including that triggering event is already registered, the operation terminal 3 can display, as a candidate to select, the action associated with the triggering event included in the linking rule. In a case where when the user has selected a triggering event, no linking rule including that triggering event is registered, the operation terminal 3 can display, as a selectable candidate(s), an action(s) that can be combined with the triggering event selected by the user. Which triggering event can be combined with which action(s) can be defined in advance for each triggering event. The operation terminal 3 can similarly display a candidate triggering event(s) (that is, second and subsequent triggering events) in addition to the triggering event selected by the user. This applies similarly to a case where the user has selected an action: The operation terminal 3 can display a candidate triggering event(s) and/or another action(s) that are selectable in combination with the selected action.

Assuming, for instance, that the user has designated an Entrance door OPEN event as a triggering event, (i) if a linking rule is registered that includes the Entrance door OPEN event as a trigger, the operation terminal 3 can display, as a selectable candidate(s), another triggering event(s) or an action(s) that are set in the linking rule, and (ii) if no linking rule is registered that includes the Entrance door OPEN event as a trigger, the operation terminal 3 can display, as a selectable candidate(s), a triggering event(s) that can be set as a trigger together with the Entrance door OPEN event or an action(s) that can be executed in response to the Entrance door OPEN event as a trigger.

In a case where in the above example, the user has selected, for example, an Entrance Locked event (that is, an event of a sensor detecting the entrance door being locked) as a triggering event from the selectable candidates, information on the combination of the Entrance door OPEN event and the Entrance Locked event can be stored. This allows the operation terminal 3 to, in a case where the user has designated the Entrance door OPEN event to register a new linking rule, display "Entrance Locked" as a selectable candidate.

Referring back to FIG. 8, in a case where the user has selected the first action setting item 53 on the UI screen illustrated in (b) of FIG. 8 to cause the candidate actions illustrated in (b) of FIG. 9 to be displayed and then selected "Robot speaking 'welcoming'" from among the candidate actions, the operation terminal 3 displays the UI screen illustrated in (c) of FIG. 8. This UI screen shows the designated action (Robot speaking 'welcoming') for the first action setting item 53 (see "53'" in FIG. 8). This first action setting item 53' differs from the first trigger setting item 51' (which indicates the designated triggering event) in that the first action setting item 53' has a double boundary. Designated triggering events and designated actions preferably have respective display forms different from each other as above for appearance discrimination.

The UI screen illustrated in (c) of FIG. 8 includes (i) a second trigger setting item 52 for accepting a designation for a second triggering event and (ii) a second action setting item 54 for accepting a designation for a second action. The user can (i) select the second trigger setting item 52 on this UI screen to cause candidate events selectable as a second triggering event to be displayed and (ii) select a desired event from among those events to set the selected event as the second triggering event. The user can similarly (i) select the second action setting item 54 on this UI screen to cause selectable candidate second actions to be displayed and (ii) select a desired action to set the selected action as the second action. When the user designates an event as the second triggering event, the UI screen also accepts a designation for an upper limit of the time period (set time period) between (i) detection of occurrence of the first triggering event (or the first action that immediately follows the first triggering event) and (ii) detection of occurrence of the second triggering event.

In a case where the user has selected the second trigger setting item 52 on the UI screen illustrated in (c) of FIG. 8 to cause the candidate triggering events illustrated in (a) of FIG. 9 to be displayed and then selected "TV ON" from among the candidate triggering events, the operation terminal 3 displays the UI screen illustrated in (d) of FIG. 8. This UI screen shows the designated triggering event (TV ON) for the second trigger setting item 52 (see "52" in FIG. 8). The UI screen also shows a set time period item 55 indicative of a designated time period. The example shown in FIG. 8 does not show an item for accepting a designation for a third triggering event. The UI screen can, however, accept a designation for third and subsequent triggering events as long as a designated triggering event or action can be combined with any triggering event. This applies similarly to third and subsequent actions as well.

In a case where the user has selected the second action setting item 54 on the UI screen illustrated in (d) of FIG. 8 to cause candidate actions to be displayed and then selected "TV speaking 'relaxing'" from among the candidate actions, the operation terminal 3 displays the UI screen illustrated in (e) of FIG. 8. This UI screen shows the designated action (TV speaking "relaxing") for the second action setting item 54 (see "54" in FIG. 8). The second action setting item 54', which indicates a designated action, has a double boundary similarly to the first action setting item 53' in (c) of FIG. 8.

The user can designate a desired triggering event(s), action(s), and time period on the above UI screens to generate a desired linking rule. The UI screens displayed when a linking rule is generated are, needless to say, not limited to the above examples as long as the UI screens allow the user to designate a desired triggering event(s), action(s), and time period.

Figure 10:
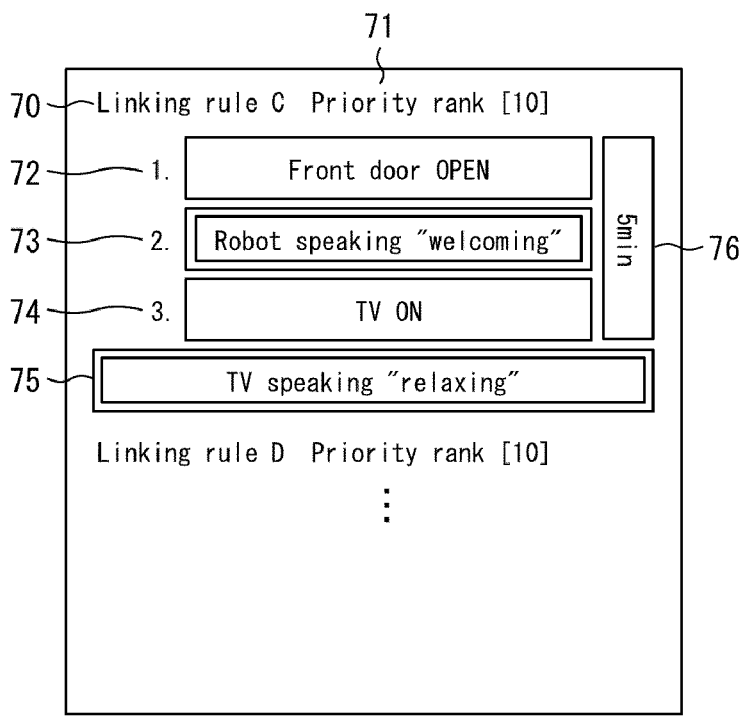
FIG. 10 is a view showing an example of a screen to be displayed to present the user with a set linking rule.

The linking system 7 can preferably be configured to allow the user to review a set linking rule on the operation terminal 3, which can, for this purpose, display a screen such as the screen illustrated in FIG. 10. FIG. 10 is a view showing an example of a screen to be displayed to present the user with a set linking rule. The example screen shown in FIG. 10 includes an identification information displaying item 70, a priority displaying item 71, a first trigger displaying item 72, a first action displaying item 73, a second trigger displaying item 74, a second action displaying item 75, and a set time period displaying item 76. The screen shows identification information for the linking rule (in this example, the name of the linking rule) for the identification information displaying item 70.

In the example shown in FIG. 10, the first action displaying item 73 and the second action displaying item 75 (each of which indicates a set action) each have a double boundary similarly to the example UI screen shown in FIG. 8. The example shown in FIG. 10 shows numbers for the first trigger displaying item 72, the first action displaying item 73, and the second trigger displaying item 74 which numbers indicate the order of occurrence of the triggers and action. The example shown in FIG. 10 also shows a set time period displaying item 76 next to the above three items. This arrangement allows the user to recognize at a glance that this linking rule requires the triggers and action for the three items to occur in the numbered order within the set time period indicated in the set time period displaying item 76.

The example shown in FIG. 10 shows a second action displaying item 75 under the three items and the set time period displaying item 76 next to the three items. This arrangement allows the user to recognize at a glance that in a case where the triggers and action for the three items have occurred within the set time period indicated in the set time period displaying item 76, the action indicated in the second action displaying item 75 will be executed at the end. A display screen such as the above can be generated by, for example, the rule generating section 102 of the linking server and displayed by the operation terminal 3, or can be generated by, for example, the rule setting section 301 of the operation terminal 3 on the basis of settings by the rule setting section 301 (of which the linking server 1 has been notified) to be displayed.

[Process Flow (Linking Rule Generation)]

Figure 11:
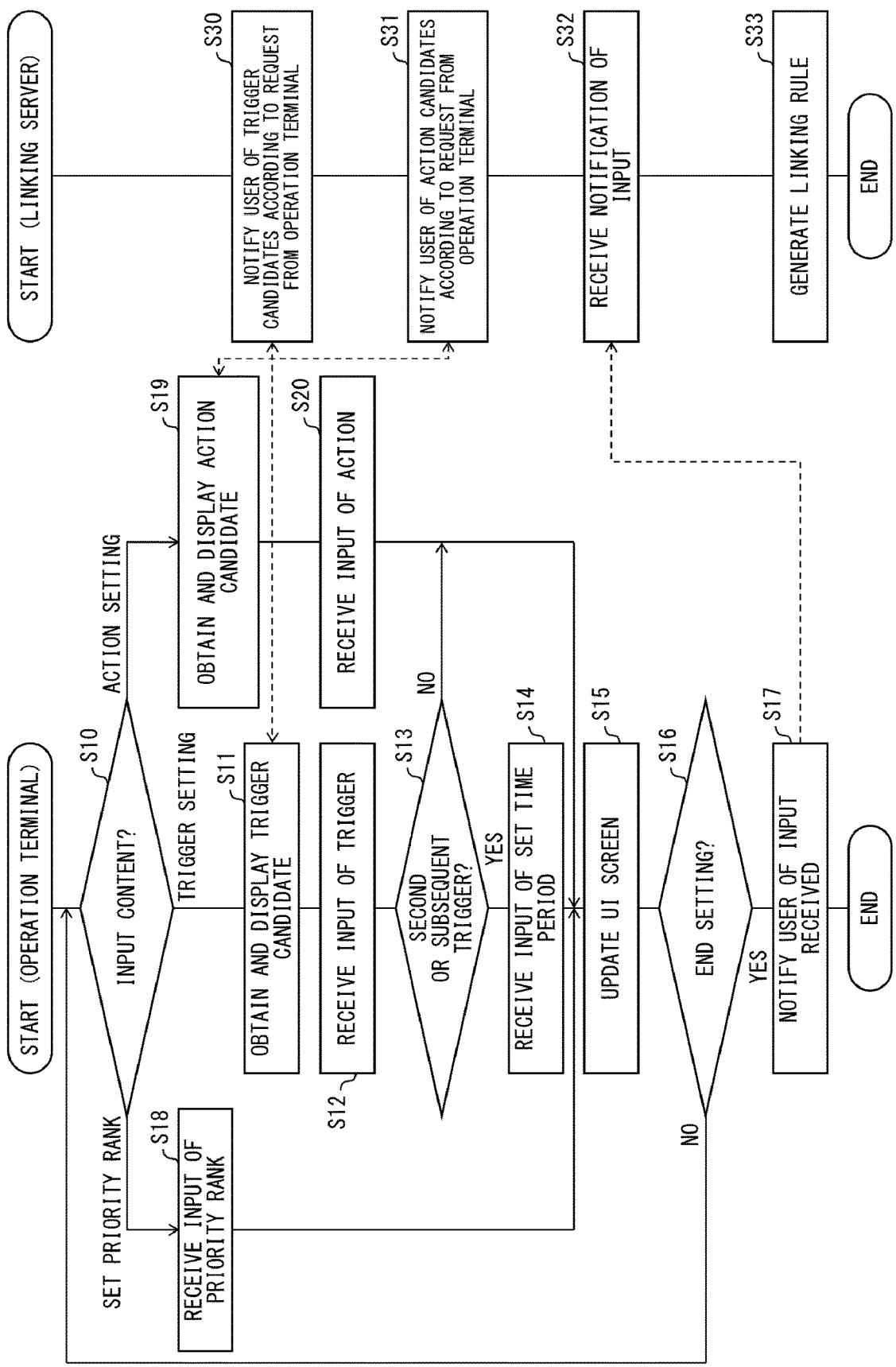
FIG. 11 is a flow chart illustrating respective processes for the operation terminal and the linking server in generating a linking rule.

With reference to FIG. 11, the following description will discuss respective process flows for the operation terminal 3 and the linking server 1 when a linking rule is generated. FIG. 11 is a flow chart illustrating respective processes for the operation terminal 3 and the linking server 1 (that is, a method of controlling a terminal device and a method of controlling a rule generating server) in generating a linking rule. FIG. 11 illustrates processes carried out after the rule setting section 301 of the operation terminal 3 has controlled the display section 33 to display a UI screen for linking rule generation (see FIG. 8) and the UI screen has accepted an input operation by the user.

First, the rule setting section 301 judges whether the input operation on the UI screen is to set a priority rank, a trigger, or an action (S10). Assuming, for instance, that the operation terminal 3 has displayed the UI screen illustrated in (a) of FIG. 8, (i) in a case where the user has selected the priority setting item 50, the rule setting section 301 judges that the input operation is to set a priority rank, and (ii) in a case where the user has selected the first trigger setting item 51, the rule setting section 301 judges that the input operation is to set a trigger. Assuming, for instance, that the operation terminal 3 has displayed the UI screen illustrated in (b) of FIG. 8, in a case where the user has selected the first action setting item 53, the rule setting section 301 judges that the input operation is to set an action.

In a case where the rule setting section 301 has judged in the step S10 that the input operation is to set a priority rank, the rule setting section 301 accepts an input (designation) of a priority rank by the user (S18). The process then proceeds to a step S15. In the step S15, the rule setting section 301 updates the UI screen to reflect the input accepted. In a case where the user has set the priority rank at 10, for instance, the rule setting section 301 controls the display section 33 to show "10" for the priority rank as illustrated in (b) of FIG. 8. The process then proceeds to a step S16.

In a case where the rule setting section 301 has judged in the step S10 that the input operation is to set a trigger, the candidate obtaining section 302 obtains, from the linking server 1, information on a candidate triggering event(s) and controls the display section 33 to display the candidate triggering event(s) (S11). The candidate obtaining section 302 can set a condition for obtaining information on a candidate triggering event(s). The candidate obtaining section 302 can, for instance, notify the linking server 1 of the user ID of the user of the operation terminal 3 and obtain information on a candidate triggering event(s) selectable by the user having that user ID. In a case where the user has already designated a triggering event(s) or action(s), the candidate obtaining section 302 can (i) notify the linking server 1 of the triggering event(s) or action(s), (ii) obtain information on a candidate triggering event(s) selectable in combination with the triggering event(s) or action(s), and (iii) control the display section 33 to display the candidate triggering event(s) (see (a) of FIG. 9).

Subsequently, the rule setting section 301 accepts an input (designation) of a triggering event by the user (S12, rule setting step). The rule setting section 301 then judges whether the triggering event of which the input has been accepted in the step S12 is a second or subsequent triggering event (S13). In a case where the rule setting section 301 has judged that the triggering event of which the input has been accepted in the step S12 is a first triggering event (NO in S13), the process proceeds to the step S15. In a case where the rule setting section 301 has judged that the triggering event of which the input has been accepted in the step S12 is a second or subsequent triggering event (YES in S13), the rule setting section 301 accepts an input of a set time period (S14, rule setting step). The process then proceeds to the step S15.

In the step S15 after the step S13 or S14, the rule setting section 301 updates the UI screen to cause the UI screen to reflect the input accepted and to accept an input operation for designating another action or triggering event. In a case where, for instance, the rule setting section 301 has accepted a designation for a first triggering event, the rule setting section 301 controls the display section 33 to display the designated triggering event for the first trigger setting item 51' together with the second trigger setting item 52 and the first action setting item 53 as illustrated in (b) of FIG. 8. The process then proceeds to the step S16.

In a case where the rule setting section 301 has judged in the step S10 that the input operation is to set an action, the candidate obtaining section 302 obtains information on a candidate action(s) from the linking server 1 and controls the display section 33 to display the candidate action(s) (S19). The candidate obtaining section 302 can set a condition for obtaining information on a candidate action(s). The candidate obtaining section 302 can, for instance, notify the linking server 1 of the user ID of the user of the operation terminal 3 and obtain information on a candidate action(s) selectable by the user having that user ID. In a case where the user has already designated a triggering event(s) or action(s), the candidate obtaining section 302 can (i) notify the linking server 1 of the triggering event(s) or action(s), (ii) obtain information on a candidate action(s) selectable in combination with the triggering event(s) or action(s), and (iii) control the display section 33 to display the candidate action(s) (see (b) of FIG. 9). After the step S19, the rule setting section 301 accepts an input (designation) of an action by the user (S20, rule setting step). The process then proceeds to the step S15.

In the step S15 after the step S20, the rule setting section 301 updates the UI screen to cause the UI screen to reflect the input accepted and to accept an input operation for designating another action or triggering event. In a case where, for instance, the rule setting section 301 has accepted a designation for a first action, the rule setting section 301 controls the display section 33 to display the designated action for the first action setting item 53' together with the second trigger setting item 52 and the second action setting item 54 as illustrated in (c) of FIG. 8. The process then proceeds to the step S16.

In the step S16, the rule setting section 301 judges whether a user operation has been carried out to end setting the linking rule. In a case where the rule setting section 301 has judged that a user operation has been carried out to end setting the linking rule (YES in S16), the information notifying section 300 notifies the linking server 1 of any input (for example, of a trigger, an action, a set time period, and/or the order of triggering events) accepted up to that time point (S17, information notifying step). The process carried out by the operation terminal 3 ends here. The information notifying section 300 can notify the linking server 1 of (i) all accepted inputs together when a user operation has been carried out to end setting the linking rule as in this example, or (ii) each accepted input sequentially when the rule setting section 301 has accepted the input.

In a case where the rule setting section 301 has judged that no user operation has been carried out to end setting the linking rule (NO in S16), the rule setting section 301 returns to the step S10 to accept an input of any of various information items for generation of the linking rule.

The description below deals with the process carried out by the linking server 1. The operation terminal 3, as described above, requests the linking server 1 to transmit information on a candidate triggering event(s) to the operation terminal 3. In response to this request, the candidate notifying section 101 of the linking server 1 notifies the operation terminal 3 of a candidate triggering event(s) (S30). The operation terminal 3, as described above, also requests the linking server 1 to transmit information on a candidate action(s) to the operation terminal 3. In response to this request, the candidate notifying section 101 of the linking server 1 notifies the operation terminal 3 of a candidate action(s) (S31).

The operation terminal 3, as described above, notifies the linking server 1 of any input accepted. The setting receiving section 100 of the linking server 1 receives this notification (S32, receiving step). The rule generating section 102 then associates the information items included in the inputs with each other to generate a linking rule (S33, rule generating step) and registers the generated linking rule as part of the linking rule management information 111 to end the process carried out by the linking server 1.

Embodiment 5

The preceding embodiments discussed examples in each of which a single linking server 1 is used. Alternatively, it is possible to use separate servers to achieve each function of the linking server 1. In a case where a plurality of servers are employed, each server can be managed by the same operator or by differing operators. This also applies to each of the servers described above, such as the device controlling server 2.

Note that each of the servers described above can be a computer system constituted by a single computer or a system constituted by a group of computers, such as a group including a plurality of computers, a database, and a load balancer. In other words, each of the servers described above can be (i) a computer system which achieve a predefined function via a body (device) which is singular in a physical sense, or (ii) a computer system which realizes a predefined function via a body (constituted by a plurality of devices) which is singular in a theoretical sense.

Embodiment 6

Each block of the linking server 1 and the operation terminal 3 can be realized by a logic circuit (hardware) provided in an integrated circuit (IC chip) or the like or can be alternatively realized by software as executed by a central processing unit (CPU). In the latter case, the linking server 1 and the operation terminal 3 each be realized by a computer (electronic computer) as illustrated in FIG. 12.

Figure 12:
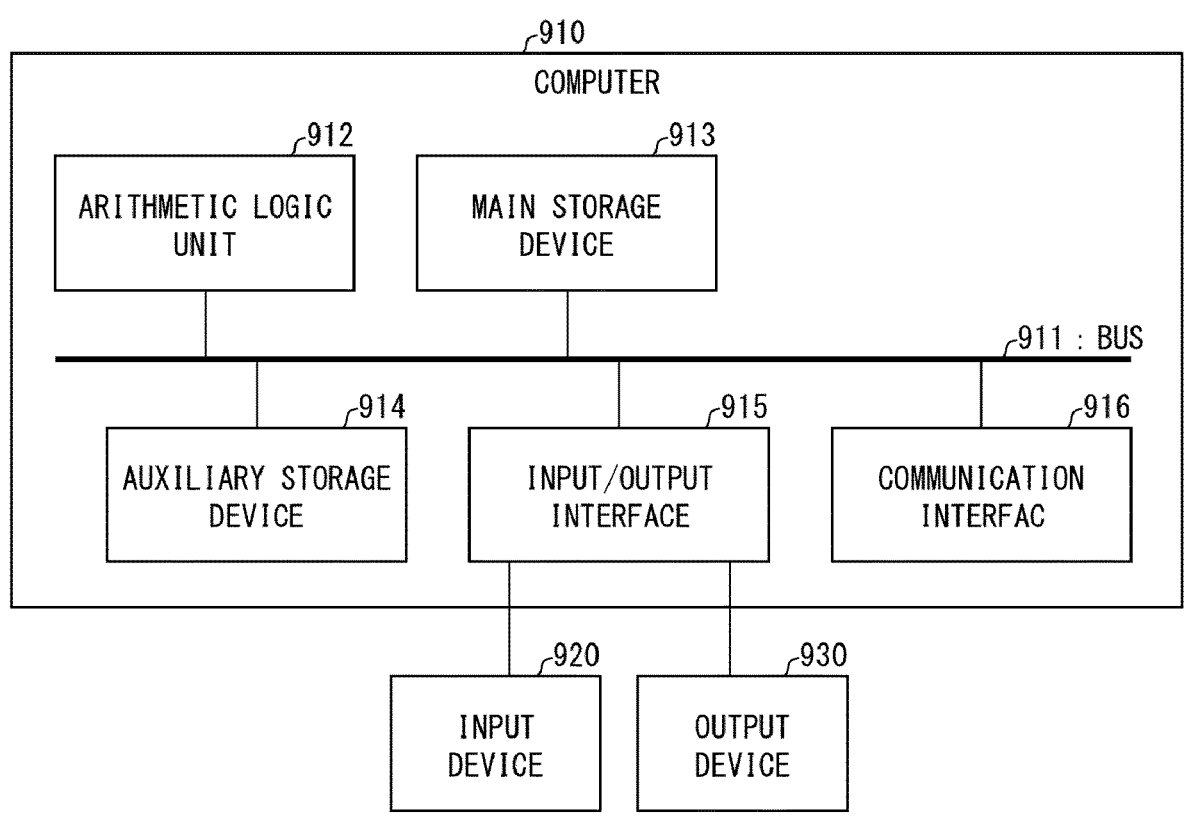
FIG. 12 is a block diagram illustrating a configuration of a computer by which the linking server and the operation terminal in accordance with the above embodiments can be achieved.

FIG. 12 is a block diagram illustrating a configuration of a computer 910 by which the linking server 1 and the operation terminal 3 can be realized. The computer 910 includes (i) an arithmetic logic unit 912, (ii) a main storage device 913, (iii) an auxiliary storage device 914, (iv) an input/output interface 915, and (v) a communication interface 916 that are connected to each other via a bus 911. Each of the arithmetic logic unit 912, the main storage device 913, and the auxiliary storage device 914 can be realized by, for example, a CPU, a random access memory (RAM), or a hard disk drive. The input/output interface 915 is connected with (i) an input device 920 via which a user inputs various information into the computer 910 and (ii) an output device 930 via which the computer 910 outputs various information to the user. Each of the input device 920 and the output device 930 can be embedded in the computer 910 or can be alternatively connected to the computer 910 (externally connected to the computer 910). For example, the input device 920 can be a keyboard, a mouse, a touch sensor, or the like, and the output device 930 can be a display, a printer, a speaker, or the like. Alternatively, a device having both of a function of the input device 920 and a function of the output device 930 (such as a touch panel into which a touch sensor and a display are integrated) can be employed. The communication interface 916 is an interface via which the computer 910 communicates with an external device.

The auxiliary storage device 914 stores various programs for controlling the computer 910 to operate as the linking server 1 and the operation terminal 3. The arithmetic logic unit 912 controls the computer 910 to operate as sections included in the linking server 1 and the operation terminal 3 by (i) loading, onto the main storage device 913, the programs stored in the auxiliary storage device 914 and (ii) executing instructions carried out in the programs. Note that a recording medium which is included in the auxiliary storage device 914 for recording information, such as the various programs, only needs to be a computer-readable "non-transitory tangible medium." Examples of the recording medium include tapes, disks, cards, semiconductor memories, and programmable logic circuits.

The various programs can be obtained from outside of the computer 910. In such a case, the various programs can be obtained via any transmission medium (such as a communication network or a broadcast wave). The present invention can also be achieved in the form of a computer data signal in which the various programs are embodied via electronic transmission and which is embedded in a carrier wave.

[Recap]

An operation execution controlling server (linking server 1) in accordance with Aspect 1 of the present invention is an operation execution controlling server which controls an operation execution service to execute an action in accordance with a linking rule indicative of the action and of a trigger that triggers the action, the linking rule being set so that occurrences of a plurality of events serve as the trigger corresponding to the action, the operation execution controlling server including: an event detecting section (103); and an operation execution control section (action execution control section), the event detecting section being configured to detect each of the occurrences of the plurality of events according to information received from an information providing service, and the operation execution control section being configured to control the operation execution service to execute the action in a case where the event detecting section detects an occurrence of one of the plurality of events and then detects, within a certain time period, occurrences of all of remaining ones of the plurality of events.

According to the configuration, the action specified in the linking rule is executed in a case where the occurrence of one of the plurality of events set as a trigger in the linking rule is detected and then, within the certain time period, the occurrences of all of the remaining ones of the plurality of events are detected. This advantageously brings about the effect of being able to execute an action according to a circumstance in which a plurality of events occur within a certain time period. Note that each event is preferably an event based on a behavior of a user. This make it possible to execute an action according to a circumstance in which a user exhibits a plurality of certain behaviors within a certain time period.

In Aspect 2 of the present invention, the operation execution controlling server of Aspect 1 can be configured so that: the linking rule is set so as to specify an order of the occurrences of the plurality of events; and the operation execution control section controls the operation execution service to execute the action in a case where the event detecting section detects that the plurality of events have occurred in the order thus specified.

According to the configuration, an action is executed in a case where it is detected that the plurality of events occur in the order specified in the linking rule. This makes it possible to execute an action according to a circumstance in which a plurality of events occur in a certain order. For example, it is possible to control a certain device to speak a send-off message (such as "Have a nice day") in a case where (i) an event in which a living room door is opened occurs and then (ii) an event in which a front door is opened occurs. Meanwhile, it is also possible to control the certain device to speak a welcoming message (such as "Welcome home") in a case where (i) an event in which the front door is opened occurs and then (ii) an event in which the living room door is opened occurs.

In Aspect 3 of the present invention, the operation execution controlling server of Aspect 1 or 2 can be configured so that in a case where a plurality of linking rules are set and a plurality of actions respectively associated with the plurality of linking rules should be executed, the operation execution control section controls one or none of the actions to be executed.

According to the configuration, in a case where a plurality of linking rules are set and a plurality of actions respectively associated with the plurality of linking rules should be executed, one or none of the actions is executed. This makes it possible to avoid a problem which arises in a case where (i) a plurality of actions occur simultaneously or (ii) instructions to execute a plurality of actions are simultaneously given. For example, it is possible to avoid problems such as (i) a problem in which a plurality of devices speak simultaneously, so that a user has trouble hearing a speaking content of each of the devices or (ii) a problem in which a device simultaneously receives instructions to execute a plurality of actions, so that a load on the device for processing information becomes excessive.

Note that in a case where any one of the actions is to be executed, it is possible to execute an action specified in a linking rule which has been used more times (the number of times a specified action has been executed) than the other linking rules in the past. This makes it possible to execute an action that is assumed to be most desired by the user in view of the past history.

Alternatively, in a case where any one of the actions is to be executed, it is possible to execute an action specified in a linking rule which has a preset priority rank that is higher than those of the other linking rules. In such a case, the priority ranks can be set by the user. This makes it possible to execute an action specified in a linking rule that is in accordance with the intention of the user.

In aspect 4 of the present invention, the operation execution controlling server of any one of Aspects 1 through 3 can be configured so that: the plurality of events include an action event for causing another action, which is different from the action, to be executed; the operation execution control section controls the operation execution service or another operation execution service to execute the another action associated with the action event; and the event detecting section detects an occurrence of the action event in a case where the operation execution control section controls the another action to be executed.

According to the configuration, the plurality of events specified in a linking rule include an action event. Then, an occurrence of the action event is detected in a case where the another action is executed. Therefore, an action specified in a linking rule can be executed under a condition in which the action event has occurred. This aspect of the present invention is useful in a case where the another action associated with the action event needs to (or preferably) have already been executed in order for the action specified in the linking rule to be executed.

In Aspect 5 of the present invention, the operation execution controlling server of Aspect 4 can be configured so that in a case where the event detecting section detects occurrences of all of the plurality of events except for the action event, the operation execution control section controls the operation execution service or the another operation execution service to execute an alternative action as an alternative to the another action.

According to the configuration, in a case where occurrences of all of the plurality of events except for the action event are detected, the operation execution service or the another operation execution service is controlled to execute an alternative action as an alternative to the another action. In this way, the fact that the another action of the action event was not executed can be covered by executing its alternative action.

Note that the alternative action can be any action, execution of which is meaningful in a case where the another action of the action event was not executed. For example, in a case where the another action of the action event is of a certain device to speak a certain message, an alternative action can be an action for another device to speak the certain message.

A rule generating server (linking server 1) in accordance with Aspect 6 of the present invention is a rule generating server that generates a linking rule in accordance with which an operation execution controlling server (linking server 1) controls an operation execution service to execute an action, the linking rule being able to specify a plurality of events, an occurrence of each of which is detected (i) as a trigger that triggers the action and (ii) according to information providing service transmitted from an information providing service to the operation execution controlling server, the rule generating server including: a receiving section (setting receiving section 100); and a rule generating section (102), the receiving section being configured to receive, from a terminal device (operation terminal 3) for use in registration of the linking rule, (i) designation of the action, (ii) designation of the plurality of events, and (iii) designation of an upper limit of a time period between a time point at which an occurrence of one of the plurality of events is detected and a time point at which occurrences of all of remaining ones of the plurality of events, and the rule generating section being configured to generate the linking rule in which the action, the plurality of events, and the time period thus received by the receiving section are associated with each other.

According to the configuration, generated is the linking rule in which the action, the plurality of events, and the time period thus received from the terminal device are associated with each other. This advantageously brings about the effect of being able to control the operation execution controlling server to use the generated linking rule so as to execute an action according to a circumstance in which a plurality of events occur within a certain time period. Note that the rule generating server and the operation execution controlling server can be of an integrated device or can be separates devices.

In Aspect 7 of the present invention, the rule generating server of Aspect 6 can be configured to further include a candidate notifying section (101) which notifies, in a case where the receiving section receives designation of one of the plurality of events, the terminal device of at least one of (i) an event which can serve as the trigger together with the one of the plurality of events and (ii) an action which can be triggered by the trigger.

According to the configuration, in a case where designation of one of the plurality of events is received, the terminal device is notified of at least one of (i) an event which can serve as the trigger together with the one of the plurality of events and (ii) an action which can be triggered by the trigger. This allows the user of the terminal device to select an event(s) and an action, which should be included in a linking rule, from (i) the event which can serve as the trigger together with the one of the plurality of events and (ii) the action which can be triggered by the trigger.

A terminal device (operation terminal 3) in accordance with Aspect 8 of the present invention is a terminal device that controls a rule generating server to generate a linking rule in accordance with which an operation execution controlling server controls an operation execution service to execute an action, the linking rule being able to specify a plurality of events, an occurrence of each of which is detected by the operation execution controlling server (i) as a trigger that triggers the action and (ii) according to information providing service transmitted from an information providing service to the operation execution controlling server, the terminal device including: a rule setting section (301); and an information notifying section (300), the rule setting section being configured to receive, from a user who registers the linking rule, (i) designation of the action, (ii) designation of the plurality of events, and (iii) designation of an upper limit of a time period between a time point at which an occurrence of one of the plurality of events is detected and a time point at which occurrences of all of remaining ones of the plurality of events, and the information notifying section being configured to notify the rule generating server of the action, the plurality of events, and the time period thus received by the rule setting section, so that the rule generating server generates the linking rule in which the action, the plurality of events, and the time period are associated with each other.

According to the configuration, the rule generating server is controlled to generate the linking rule in which the action, the plurality of events, and the time period thus received from the user are associated with each other. This advantageously brings about the effect of being able to control the operation execution controlling server to use the generated linking rule so as to execute an action according to a circumstance in which a plurality of events occur within a certain time period.

In Aspect 9 of the present invention, the terminal device of Aspect 8 can be configured so that: the plurality of events can include at least one action event which causes the operation execution service or another operation execution service to execute another action that is different from the action; and the rule setting section is configured to present, to the user in a case where the designation of the action event is received, at least one of (i) an event which can serve as the trigger together with the action event and (ii) an action which can be triggered by the trigger.

A linking system (7) in accordance with Aspect 10 of the present invention is a linking system including: an information providing server (5); a device controlling server (2); an operation execution controlling server (linking server 1); and a control-target device (device 4), the operation execution controlling server being configured to control the control-target device to execute an action in accordance with a linking rule indicative of the action and of a trigger that triggers the action, the linking rule being set so that occurrences of a plurality of events serve as the trigger corresponding to the action, the information providing server being configured to transmit, to the operation execution controlling server, information concerning the plurality of events, and the operation execution controlling server being configured to control, via the device controlling server, the control-target device to execute the action in a case where an occurrence of one of the plurality of events is detected according to the information transmitted from the information providing server and then, within a certain time period, occurrences of all of remaining ones of the plurality of events are detected. The linking system thus configured brings about an advantageous effect similar to that of Aspect 1.

An operation execution controlling server controlling method in accordance with Aspect 11 of the present invention is a method of controlling an operation execution controlling server which controls an operation execution service to execute an action in accordance with a linking rule indicative of the action and of a trigger that triggers the action, the linking rule being set so that occurrences of a plurality of events serve as the trigger corresponding to the action, the method including the steps of: (a) detecting each of the occurrences of the plurality of events according to information received from an information providing service (S1); and (b) controlling the operation execution service to execute the action in a case where in the step (a), an occurrence of one of the plurality of events is detected and then, within a certain time period, occurrences of all of remaining ones of the plurality of events are detected (S4). The controlling method thus configured brings about an advantageous effect similar to that of Aspect 1.

A rule generating server controlling method in accordance with Aspect 12 of the present invention is a method of controlling a rule generating server that generates a linking rule in accordance with which an operation execution controlling server controls an operation execution service to execute an action, the linking rule being able to specify a plurality of events, an occurrence of each of which is detected (i) as a trigger that triggers the action and (ii) according to information providing service transmitted from an information providing service to the operation execution controlling server, the method including the steps of: (a) receiving, from a terminal device for use in registration of the linking rule (S32), (i) designation of the action, (ii) designation of the plurality of events, and (iii) designation of an upper limit of a time period between a time point at which an occurrence of one of the plurality of events is detected and a time point at which occurrences of all of remaining ones of the plurality of events; and (b) generating the linking rule in which the action, the plurality of events, and the time period thus received in the step (a) are associated with each other (S33). The controlling method thus configured brings about an advantageous effect similar to that of Aspect 6.

A terminal device controlling method in accordance with Aspect 13 of the present invention is a method of controlling a terminal device that controls a rule generating server to generate a linking rule in accordance with which an operation execution controlling server controls an operation execution service to execute an action, the linking rule being able to specify a plurality of events, an occurrence of each of which is detected by the operation execution controlling server (i) as a trigger that triggers the action and (ii) according to information providing service transmitted from an information providing service to the operation execution controlling server, the method including the steps of: (a) receiving, from a user who registers the linking rule, (i) designation of the action, (ii) designation of the plurality of events, and (iii) designation of an upper limit of a time period between a time point at which an occurrence of one of the plurality of events is detected and a time point at which occurrences of all of remaining ones of the plurality of events (S12, step S14, step S20); and (b) notifying the rule generating server of the action, the plurality of events, and the time period thus received in the step (a), so that the rule generating server generates the linking rule in which the action, the plurality of events, and the time period are associated with each other (S17). The controlling method thus configured brings about an advantageous effect similar to that of Aspect 8.

The operation execution controlling server, the rule generating server, and the terminal device in accordance with each of Aspects of the present invention can each be achieved by a computer. In such a case, the scope of the present invention also encompasses (i) a control program which, with use of the computer, achieves the operation execution controlling server, the rule generating server, or the terminal device by controlling the computer to serve as the sections (software elements) included in the operation execution controlling server, the rule generating server, or the terminal device and (ii) a computer-readable storage medium in which the control program is stored.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Linking server (rule generating server)
100 Setting receiving section (receiving section)
101 Candidate notifying section
102 Rule generating section
105 Action execution control section (operation execution control section)
2 Device controlling server 3 Operation terminal (terminal device)
300 Information notifying section
301 Rule setting section
4 Device (control-target device)
5 Information providing server
7 Linking system

The invention claimed is:

1. An operation execution controlling server which controls an operation execution service to execute an action in accordance with a linking rule indicative of the action and of a trigger that triggers the action, the linking rule being set so that occurrences of a plurality of events serve as the trigger corresponding to the action, the operation execution controlling server comprising:
a processor;
a memory in electronic communication with the processor;
instructions stored in the memory, the instructions being executable to:
detect each of the occurrences of the plurality of events according to information received from an information providing service, and
control the operation execution service to execute the action in a case where an occurrence of one of the plurality of events is detected and then, within a certain time period, occurrences of all of remaining ones of the plurality of events are detected,
the plurality of events including an action event for causing another action, which is different from the action, to be executed,
the instructions being executable to:
control the operation execution service or another operation execution service to execute the another action associated with the action event;
detect an occurrence of the action event in a case where the another action is executed, and
in a case where occurrences of all of the plurality of events except for the action event are detected, control the operation execution service or the another operation execution service to execute an alternative action that compensates for failure to cause the another action to be executed.

2. The operation execution controlling server as set forth in claim 1, wherein:
the linking rule is set so as to specify an order of the occurrences of the plurality of events; and
the instructions are executable to control the operation execution service to execute the action in a case where it is detected that the plurality of events have occurred in the order thus specified.

3. The operation execution controlling server as set forth in claim 1, wherein:
in a case where a plurality of linking rules are set and a plurality of actions respectively associated with the plurality of linking rules should be executed, the instructions are executable to control one or none of the actions to be executed.

4. A linking system comprising:
an information providing server;
a device controlling server;
an operation execution controlling server;
and a control-target device,
the operation execution controlling server being configured to control the control-target device to execute an action in accordance with a linking rule indicative of the action and of a trigger that triggers the action, the linking rule being set so that occurrences of a plurality of events serve as the trigger corresponding to the action, the information providing server being configured to transmit, to the operation execution controlling server, information concerning the plurality of events, and the operation execution controlling server being configured to control, via the device controlling server, the control-target device to execute the action in a case where an occurrence of one of the plurality of events is detected according to the information transmitted from the information providing server and then, within a certain time period, occurrences of all of remaining ones of the plurality of events are detected, in the operation execution controlling server, the plurality of events including an action event for causing another action, which is different from the action, to be executed, the operation execution controlling server controlling the operation execution service or another operation execution service to execute the another action associated with the action event, the operation execution controlling server detecting an occurrence of the action event in a case where the another action is executed, and in a case where occurrences of all of the plurality of events except for the action event are detected, the operation execution controlling server controlling the operation execution service or the another operation execution service to execute an alternative action that compensates for failure to cause the another action to be executed.

5. A method of controlling an operation execution controlling server which controls an operation execution service to execute an action in accordance with a linking rule indicative of the action and of a trigger that triggers the action, the linking rule being set so that occurrences of a plurality of events serve as the trigger corresponding to the action, the method comprising the steps of:
(a) detecting each of the occurrences of the plurality of events according to information received from an information providing service; and
(b) controlling the operation execution service to execute the action in a case where in the step (a), an occurrence of one of the plurality of events is detected and then, within a certain time period, occurrences of all of remaining ones of the plurality of events are detected, the plurality of events including an action event for causing another action, which is different from the action, to be executed, the step (b) comprising controlling the operation execution service or another operation execution service to execute the another action associated with the action event, the step (a) comprising detecting an occurrence of the action event in a case where the another action is executed, and the step (b) comprising, in a case where occurrences of all of the plurality of events except for the action event are detected, controlling the operation execution service or the another operation execution service to execute an alternative action that compensates for failure to cause the another action to be executed.

* * * * *